(12) United States Patent
Roy

(10) Patent No.: US 6,310,862 B1
(45) Date of Patent: Oct. 30, 2001

(54) REAL-TIME MULTIMEDIA CONFERENCING OVER AN ATM NETWORK USING AN INTELLIGENT ATM CABLE MODEM AND HYBRID FIBER-COAX ACCESS

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/881,261

(22) Filed: Jun. 24, 1997

(51) Int. Cl.[7] .............................. H04L 12/16; H04Q 11/00
(52) U.S. Cl. .......................... 370/260; 370/395; 370/401; 455/416
(58) Field of Search ................................. 370/260, 261, 370/262, 263, 264, 265, 395, 400, 401; 395/200.34; 709/204; 348/13, 14, 15

(56) References Cited

U.S. PATENT DOCUMENTS

| | | | |
|---|---|---|---|
| 5,617,539 | * 4/1997 | Ludwig et al. | 395/200.02 |
| 5,712,968 | * 1/1998 | Nakayama et al. | 395/182.02 |
| 5,758,079 | * 5/1998 | Ludwig et al. | 395/200.34 |
| 5,790,806 | * 8/1998 | Koperda | 709/252 |
| 5,877,821 | * 3/1999 | Newlin et al. | 348/724 |
| 5,915,091 | * 6/1999 | Ludwig et al. | 395/200.34 |
| 6,028,860 | * 2/2000 | Laubach et al. | 370/395 |

OTHER PUBLICATIONS

Newton's Telecom Dictionary the official Dictionary of Computer Telephony, Telecommunications, Networking, Data Communications, Voice Processing and the Internet; Harry Newton; 1994; pp. 659–660.*

* cited by examiner

*Primary Examiner*—Ajit Patel
*Assistant Examiner*—Bob A. Phunkulh

(57) ABSTRACT

A technique for providing real-time multimedia conferencing services with guaranteed performance, in a hybrid networking environment, by interconnecting cable modem-based premises networks via hybrid fiber coaxial (HFC) access networks and an ATM wide area network is disclosed. A functional design constitutes both component and protocol architecture of an ATM cable modem for both premises networks and headend stations. The ATM wide area network may be divided into a plurality of access network domains and one backbone network domain to provide efficient and intelligent multimedia conferencing services. Each ATM access network domain has one cable modem server as well as access multimedia bridge server, while there is only one central network server and one central multimedia bridge server within the backbone network domain.

Each cable modem server located in an ATM access network domain maintains necessary information of how the bandwidth of the cable network is being used by existing calls, and how the cable bandwidth will be allocated when new multimedia conference calls are initiated, in accordance with the desired priority and performance levels. If all conference participants are connected to the same ATM access network domain, the access multimedia bridge server of that domain will provide bridging, otherwise the central multimedia bridge will provide bridging. An integrated call control algorithm and cable modem control and signaling protocol scheme has been developed to set up multimedia conference calls that guarantee bandwidth over the cable access network as well within the wide area ATM network.

19 Claims, 14 Drawing Sheets

FIG. 2

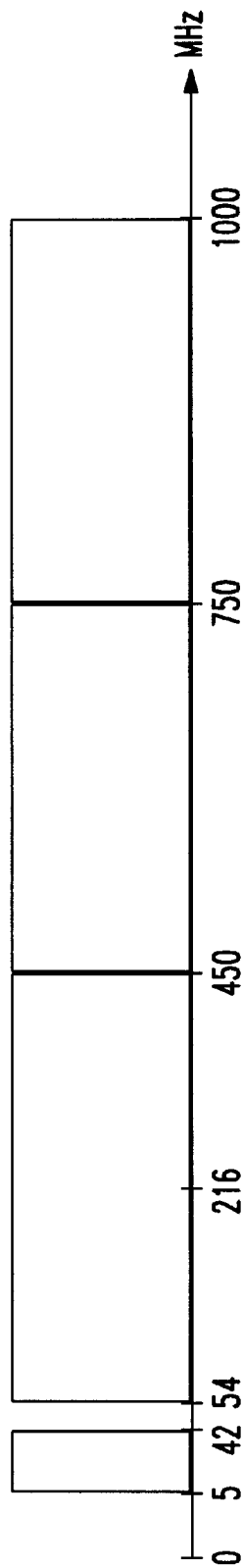

54 − 450 MHz : BROADCAST DOWNSTREAM (FROM CABLE HEADEND TO HOME/OFFICE) BY TODAY'S ANALOG BROADCAST CABLE TELEVISION (CATV) WITH 6 MHz PER CHANNEL FOR NTSC VIDEO

5 − 42 MHz : UPSTREAM DATA TRANSMISSION (FROM HOME/OFFICE TO CABLE HEADEND) THROUGH SPLITTING CHANNELS (POSSIBLY 1 MHz PER CHANNEL) USING DIGITAL MODULATION SCHEMES

450 − 750 MHz : DOWNSTREAM DATA TRANSMISSION (FROM CABLE HEADEND TO HOME/OFFICE) FOR EMERGING SERVICES THROUGH SPLITTING CHANNELS (POSSIBLY 6 MHz PER CHANNEL) USING SWITCHED TRANSMISSIONS WITH DIGITAL MODULATION SCHEMES

750 − 1000 MHz : UPSTREAM/DOWNSTREAM DATA TRANSMISSION FOR FUTURE SERVICES

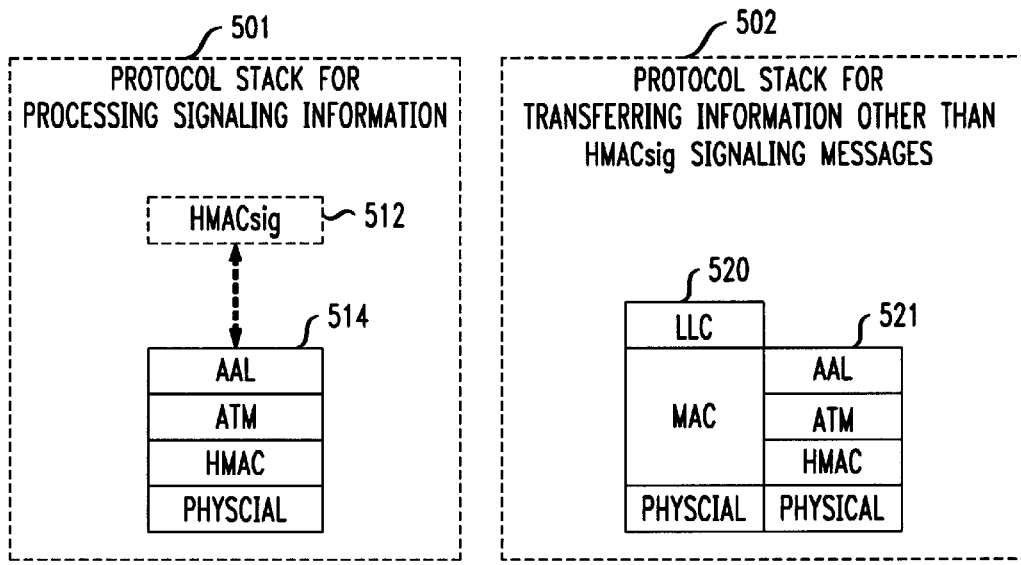
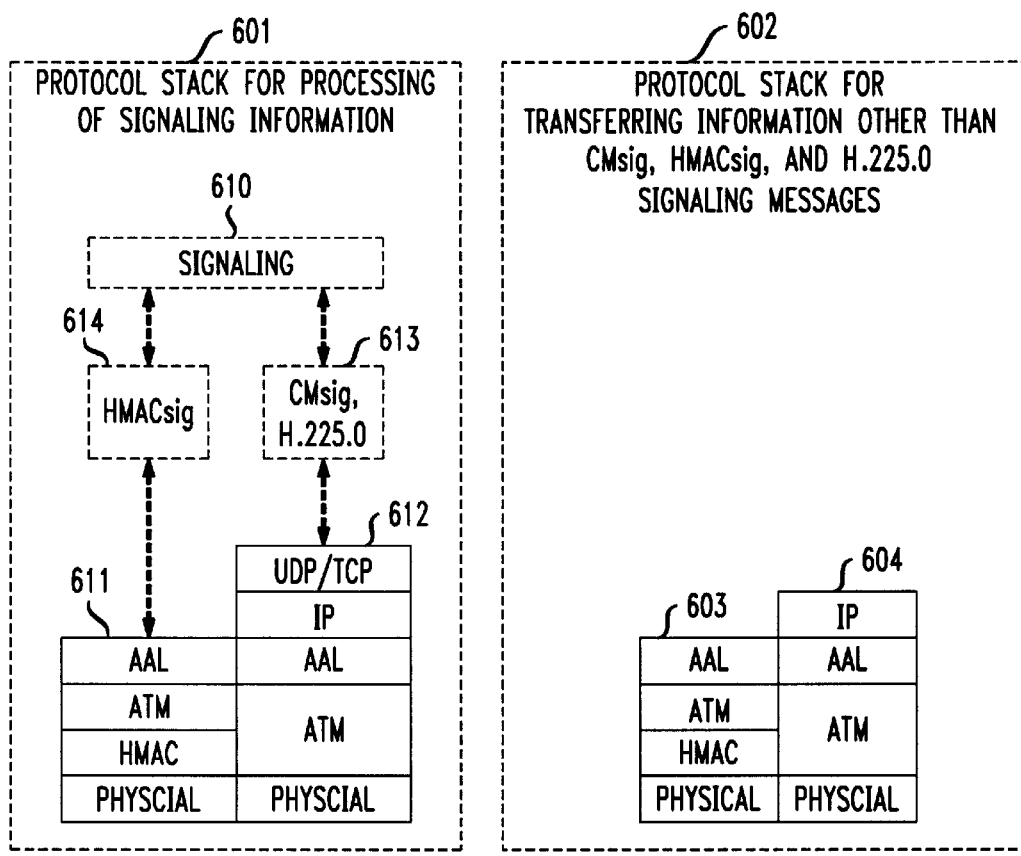

REAL-TIME MULTIMEDIA CONFERENCING OVER AN ATM NETWORK USING AN INTELLIGENT ATM CABLE MODEM AND HYBRID FIBER-COAX ACCESS

FIELD OF THE INVENTION

The present invention relates in general to multimedia conferencing, between geographically dispersed locations interconnected by an asynchronous transfer mode (ATM) wide area network (WAN), using ATM cable modem access. More particularly, the present invention relates to a novel intelligent cable modem, employing a powerful multimedia control and signaling scheme, that shares the cable bandwidth among multiple users for multimedia conferencing. An integrated call control algorithm sets up multimedia conference calls using an intelligent control and signaling protocol scheme that guarantees bandwidth over the hybrid fiber-coax cable access network and within the wide area ATM network.

BACKGROUND OF THE INVENTION

Various methods of providing multimedia conferencing services with guaranteed performance have been developed. Multimedia conference calls require a large amount of communication bandwidth. Cable television (CATV) hybrid fiber-coaxial (HFC) plants, having a large excess bandwidth, are an ideal candidate to provide the infrastructure necessary for multimedia conferencing services for offices and homes. However, although these "tree-type" cable network topologies are currently suitable for one-way distribution, such as broadcasting television signals from a cable headend to all end points distributed across the cable network, the existing network topology would require different intelligent networking technologies to perform two-way communications, such as providing multimedia conferencing over a hybrid fiber-coaxial (HFC) cable network.

SUMMARY OF THE INVENTION

The present invention provides a system for real-time multimedia conferencing over an ATM network using an intelligent ATM cable modem and hybrid fiber-coax access. In particular, a sophisticated cable modem which, when connected to a local area network (LAN), LAN hub, or a switched LAN hub (SLH), of a premises network, has been designed to carry two-way multimedia signals over the cable network efficiently (note that the LAN may be Ethernet (EN), Token Ring (TR), Fiber Distributed Data Interface (FDDI), etc.). Asyncronous transfer mode (ATM) protocol and IEEE 802.14 hybrid-fiber coax medium access control (HMAC) protocol are used for communication over the HFC network between premises networks and headend cable modems (hence the modem is designated an ATM cable modem). In addition, a second intelligent ATM cable modem, connected to the cable headend side for interconnection with an ATM node/switch of the wide area network, has also been designed to carry two-way multimedia signals over the cable network.

Also, as disclosed herein, a plurality of ATM access network domains are used to connect to an ATM backbone network domain, all within an ATM wide area network. A cable modem server, in each ATM access network domain, is used to allocate bandwidth over the cable network in accordance with priority and performance levels for each call originating and terminating in that access network domain. If a multimedia conference call includes conference participants from other domain(s), the call is controlled by a central ATM network server, of the ATM backbone network domain, in collaboration with the cable modem servers of the ATM access network domains.

In addition, a single access multimedia bridge server is provided in each ATM access network domain, and is used to bridge multimedia traffic over the cable network for each call originating and terminating in that access network domain. However, as with the cable modem, if a multimedia conference call includes conference participants from other domain(s), the multimedia traffic is bridged by a central multimedia bridge server, of the ATM backbone network domain, in coordination with control and signaling information received from both the cable modem servers of the ATM access network domains and the central ATM network server of the ATM backbone network domain.

A novel multimedia call control algorithm allows multimedia communications to be set up between a plurality of participants over the HFC cable network (using ATM cable modems to interconnect the premises networks) and the ATM wide area network.

In addition, intelligent control and signaling messages have been developed and are used to communicate between different entities of the HFC access network and the ATM wide area network.

The system described below allows for simultaneous multimedia conference participants that are both ATM cable modem-based premises, and non-cable modem-based premises.

BRIEF DESCRIPTION OF THE DRAWINGS

FIG. 2 is an example of an upstream/downstream spectrum allocation of a coaxial cable of the HFC network;

FIG. 5 shows a preferred form of protocol architecture for an ATM cable modem, that is connected to a multimedia personal computer/workstation using a LAN interface, in accordance with the inventive concepts;

FIG. 6 shows a preferred form of protocol architecture for an ATM cable modem, in a cable headend that is connected to ATM switches of the ATM network, in accordance with the inventive concepts;

DETAILED DESCRIPTION

Figure 1:
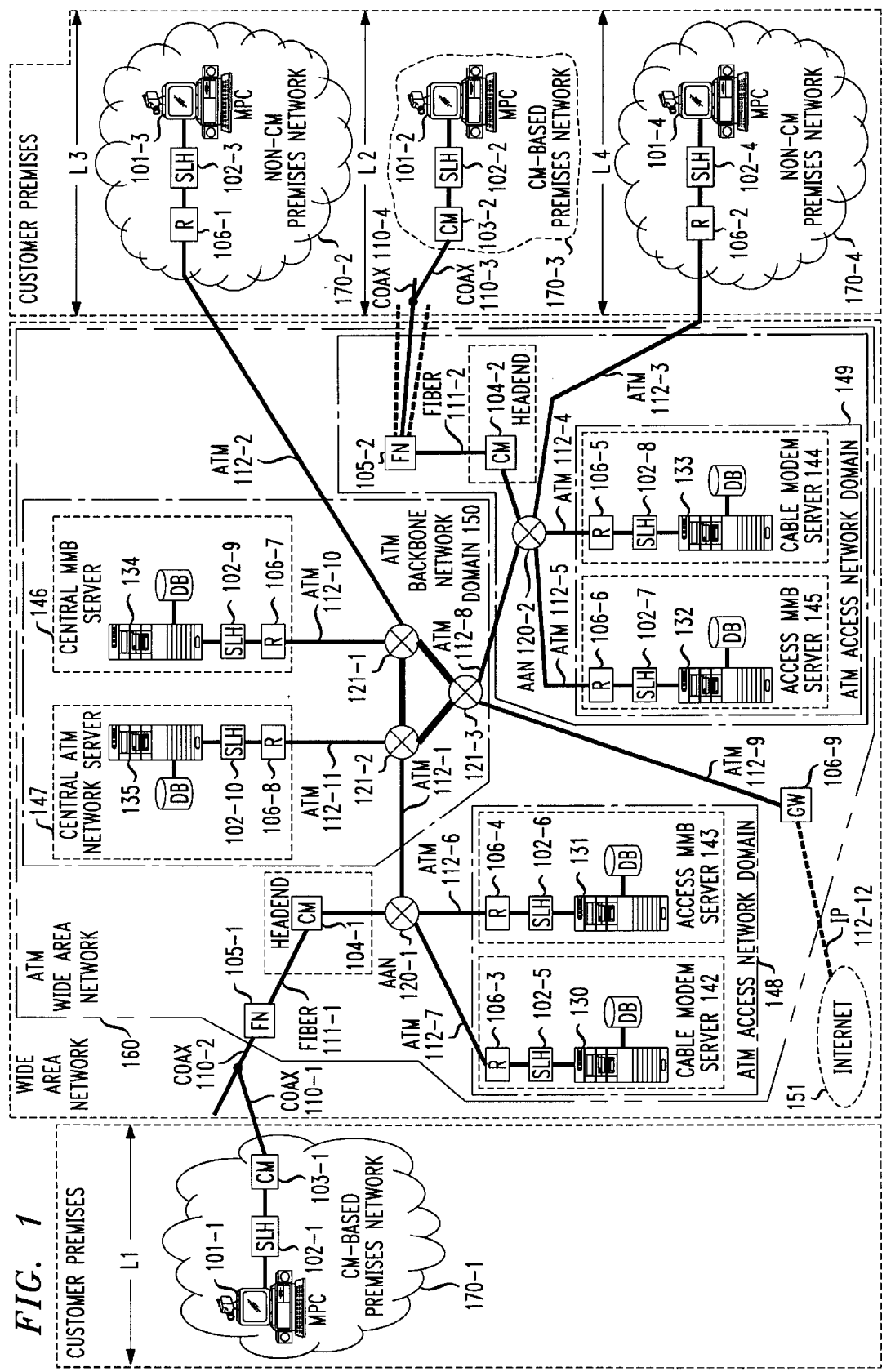
FIG. 1 illustrates a preferred form of the system architecture of end-to-end network configurations, for providing multipoint multimedia conferencing services, in accordance with the inventive concepts.

FIG. 1 illustrates a preferred form of a multimedia conferencing system architecture, setting forth an end-to-end network configuration, including multimedia personal computers/workstations (hereinafter referred to as "MPC" for simplicity) 101-1 and 101-2 (at customer premises L1 and L2 respectively), connected to ATM cable modems 103-1 and 103-2 respectively, via switched local area network hubs (SLH) 102-1 and 102-2 respectively, within cable modem (CM)-based premises networks 170-1 and 170-2 respectively. These MPC's (101-1, 101-2) are equipped with multimedia conferencing application programs based on the H.323 standard of the International Telecommunications Union (ITU) (hereinafter refered to as "H.323 protocol" only).

At location L1, ATM cable modem 103-1 is connected to a fiber node (FN) 105-1 via coaxial cables 110-1 and 110-2. Fiber node 105-1 is connected to ATM cable modem 104-1, of the headend, via fiber 111-1, while cable modem 104-1 of the headend is connected to ATM access node (AAN) 120-1 of ATM access network domain 148 of ATM wide area network 160. The ATM access node 120-1 is connected to ATM backbone node 121-2 via link 112-1 that uses ATM protocol. In accordance with the convention of this networking configuration, each cable modem (at all headends) is connected to one ATM access node (120-1 or 120-2 in FIG. 1) of the ATM access network domain (148 or 149, respectively). In addition, each ATM access node (120-1 and 120-2) is connected to the respective ATM backbone nodes (121-2 and 121-3, respectively) of ATM backbone network domain 150 of ATM wide area network 160 (note that there may be additional fiber nodes and headend cable modems in the same ATM access network domain connected to the same ATM access node, but these are not shown for simplicity).

Each ATM access network domain (148 or 149) is equipped with one cable modem server (130 or 133) and one access multimedia bridge server (131 or 132). In addition, ATM backbone network domain 150 is equipped with one central ATM network server 135 and one central multimedia bridge server 134. All switched local area network hub-based (102-5, 102-6, 102-7, 102-8, 102-9, 102-10) servers (130, 131, 132, 133, 134, 135) are connected to ATM access or ATM backbone nodes of the ATM wide area network 160 using ATM links (112-7, 112-6, 112-5, 112-4, 112-10, 112-11) via routers (106-3, 106-4, 106-6, 106-5, 106-7, 106-8, respectively).

Still referring to FIG. 1, at location L2 cable modem 103-2 is connected to fiber node (FN) 105-2 via coaxial cables 110-3 and 110-4. Fiber node 105-2 is connected to cable modem 104-2 of the headend via fiber 111-2, while cable modem 104-2 of the headend is connected to ATM access node (AAN) 120-2 of ATM access network domain 149 of ATM wide area network 160. ATM access node 120-2 is connected to ATM backbone node 121-3 via link 112-8 that uses ATM protocol. In addition to cable modem-based premises networks L1 (170-1) and L2 (170-3), the configuration also permits non-cable modem-based premises networks, as illustrated in location L3 (170-2) and location L4 (170-4), each of which do not use cable modems or hybrid/fiber cable (HFC) networks. In each of these configurations, a non-cable modem premises network (L3 or L4) is connected either directly to the ATM backbone node of the ATM backbone network domain or to an ATM access node of the ATM wide area network. Specifically for example, MPC 101-3 of non-cable modem premises network 170-2 is connected directly to ATM backbone node 121-1 of ATM backbone network domain 150 using ATM link 112-2 via router 106-1 and SLH 102-3. Also, MPC 101-4 is connected directly to ATM access node 121-2 of ATM access network domain 149 using ATM link 112-3 via router 106-2 and switched local area network hub 102-4, while ATM access node 102-2 is connected to ATM backbone node 121-3 of ATM backbone network domain 150 of ATM wide area network 160. The MPC's (101-3, 101-4) of non-cable modem premises networks 170-2 and 170-4, respectively, are also equipped with multimedia conferencing application programs based on H.323 protocol.

ATM backbone network 150 is connected to Internet 151 via gateway (GW) 106-9 which provides protocol translation between the asynchronous (ATM) and the internet protocol (IP). This facilitates the communication between the ATM network and the Internet.

Still referring to FIG. 1, a multimedia conference call originating from a cable modem-based premises network can interact with both cable modem-based premises networks and non-cable modem-based premises networks, and vice versa. In the case of cable modem-based premises networks, one fundamental contribution of the invention is a scheme described in detail below for sharing the bandwidth of the hybrid fiber coaxial (HFC) access network, for a two-way multimedia conference call, using sophisticated intelligent multimedia cable modem signaling protocol (CMsig) schemes. In this respect, a unique design of both a multimedia LAN/personal computer/workstation-based cable modem, and a headend-based cable modem, have been devised to take advantage of the intelligent multimedia signaling schemes. The decentralization of functionalities between the access network domain and the backbone network domain for initialization of multimedia conference calls as well as for establishment of virtual connections to transfer actual multimedia signals over both the HFC access network and the ATM wide area network is another aspect of the invention. In addition, the use of a cable modem server and a multimedia bridge server in each ATM access network domain, and a central ATM network server and a central multimedia bridge server in the ATM backbone network domain, along with the coordination of functionalities among these servers for initialization of multimedia conference calls, together with the establishment of virtual circuits over both the HFC access network and the ATM wide area network for actual transfer of multimedia signals with guaranteed performance, are additional fundamental aspects of the invention.

FIG. 2 provides an outline of a proposal illustrating how the bandwidth, of a coaxial cable of a hybrid fiber-coaxial (HFC) network that has a capacity of approximately one (1) gigahertz (GHz), can be shared, as considered by the Institute of Electrical and Electronics Engineers (IEEE). In order to maintain compatibility with today's analog TV channels, the spectrum of an HFC cable plant between 54 MHz and 450 MHz will not be affected by the new proposed services, but rather will be used to broadcast downstream, from the cable headend to homes and offices, with 6-MHz per channel for National Television Systems Committee (NTSC) video. The spectrum between 5 MHz and 42 MHz may be used for upstream data transmission, from offices/homes to the cable headend station, using various digital modulation schemes. The spectrum between 450 MHz and 750 MHz will be used for downstream data transmissions, from the cable headend station to offices/homes, for emerging services through splitting channels. Finally, the spectrum between 750 and 1000 MHz will be used for upstream and downstream transmissions for future services.

Still referring to FIG. 2, Applicant understands that the IEEE 802.14 working group is defining standardization for physical layer and medium access control layer protocols for HFC networks. This standard will define a full-duplex, multichannel, shared-media network consisting of a variable number of stations spread over several kilometers and a single headend controller located several tens of kilometers away from the stations. Table 1 below, presents possible control and signaling messages to be used in accordance with IEEE 802.11 HFC MAC protocol standards (henceforth, we designate this as HMACsig).

TABLE 1

Possible IEEE 802.14 HFC MAC Control
and Signaling Protocol Messages

| Control and Signaling Messages | Description |
| --- | --- |
| HMACsig 1 | source and destination addresses |
| HMACsig 2 | frame synchronization |
| HMACsig 3 | slots with contention and reservation scheme |
| HMACsig 4 | upstream and downstream bandwidth request |
| HMACsig 5 | results of contention based transmission attempts |
| HMACsig 6 | payload type: information bit stream and HFC management information |
| HMACsig 7 | request for additional transmission bandwidth |
| HMACsig 8 | acknowledgment |
| HMACsig 9 | status |
| HMACsig 10 | other control and signaling information |

The IEEE 802.14 HFC MAC layer protocol (HMAC) is expected to accommodate asynchronous transfer mode (ATM) cell in its frame that supports quality of service (QOS) constraints for various classes of traffic. It may allow for contention-based and reservation-based transmissions which are dynamically adjusted to traffic conditions, and may have provisions to operate over several modulation techniques. In accordance with one aspect of the invention, the IEEE 802.14 HFC MAC (HMAC) layer protocol standard will be used to transfer multimedia signals over HFC cable networks.

Figure 3:
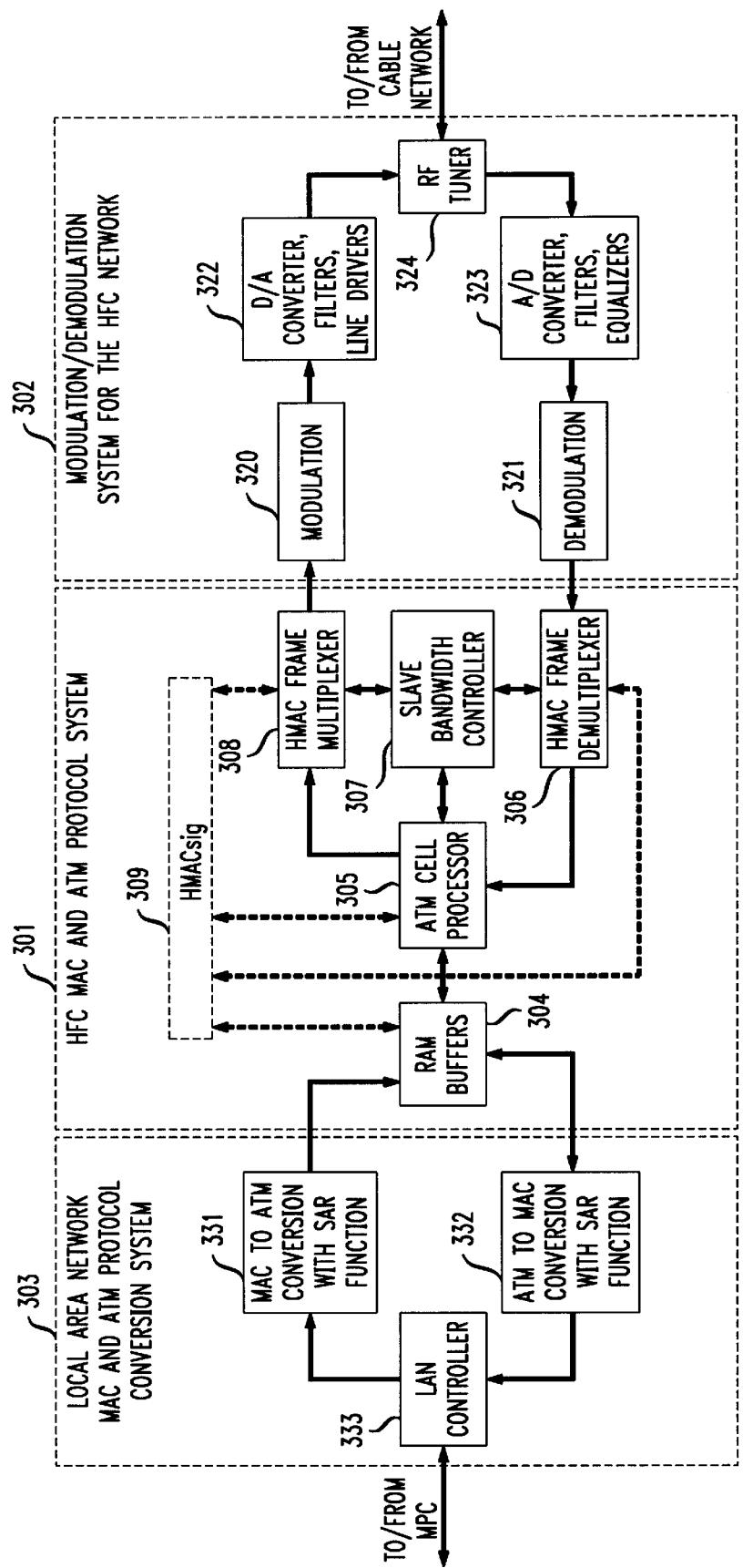
FIG. 3 is a preferred form of component architecture for an ATM cable modem, that is connected to a multimedia personal computer/workstation using a LAN interface, in accordance with the inventive concepts.

In FIG. 3, the component architecture of the cable modem to be used within a premises network for a MPC using a LAN interface is shown. There are three functional blocks: local area network medium access (MAC) and ATM protocol conversion system 303, hybrid fiber coaxial (HFC) medium access control (MAC) and ATM protocol system 301, and modulation/demodulation system for the hybrid fiber coaxial (HFC) network 302. These three functional entities 301, 302, and 303 are logical, and may be implemented either in a single physical entity, in three separate physical entities, or in any combination of three logical entities. For example, system 303 may be a separate physical entity and many MPC's, connected to different switched local area network hubs (SLHs), can be connected to a single system 303, to provide economies of scale via multiplexing. However, these three distinct logical entities 301, 302, and 303 will act as a single cable modem entity of the premises network when all functions are executed in accordance with the scheme described below.

Still referring to FIG. 3, there are three functional entities in local area network MAC and ATM protocol conversion system 303 of the cable modem to be used within the premises network: local area network controller 333, medium access control (MAC) to ATM protocol conversion with segmentation and reassembly (SAR) function 331, and ATM to medium access control (MAC) conversion with segmentation and reassembly (SAR) function 332. In LAN controller 333, the traffic coming in and out of the MPC via the LAN is controlled; specifically, if traffic comes from the MPC to the cable modem, the LAN controller directs it to functional entity 331 where medium access control (MAC) protocol of the local area network (LAN) is converted to the asynchronous transfer mode (ATM) protocol along with segmentation and reassembly (SAR) function as defined in the ATM Forum standard, however, if traffic comes from the functional entity 332 to the LAN controller 333, the LAN controller 333 sends the traffic to the MPC via the LAN. The functional entity 332 converts the asynchronous transfer mode (ATM) protocol along with segmentation and reassembly (SAR) function for the traffic coming out from the random access memory (RAM) buffer 304 to the medium access control (MAC) protocol of the LAN (as defined in the ATM Forum standard). The communication between the functional entities 331, 332, and random access buffer 304 is in full duplex mode from signaling communication point of view.

Even more specifically, the hybrid fiber coaxial (HFC) medium access control (MAC) and ATM protocol system 301 of the cable modem to be used within a premises network for MPC's using a LAN interface, has six functional entities: random access memory buffers 304, ATM cell processor 305, HFC MAC (HMAC) frame demultiplexer 306, HFC MAC (HMAC) frame multiplexer 308, slave bandwidth controller 307, and HMACsig 309. If traffic comes from the MPC to the HFC network, RAM buffers 304 store the traffic received from the functional entity 331 as ATM cells (defined in accordance with the ATM Forum standard) and then transfers the ATM cells to the ATM cell processor 305 as indicated by the HMACsig 309 entity. If traffic comes from the HFC network to the MPC, RAM buffers 304 store the traffic received from the ATM cell processor 305 as ATM cells (defined in accordance with the ATM Forum standard) and then transfer the ATM cells to the functional entity 332 as indicated by the HMACsig 309 entity. The ATM cell processor 305 handles the ATM cells to and from RAM buffers 304, transfers to the HMAC frame multiplexer 308, and receives cells from the HMAC frame demultiplexer 306 in accordance with schemes directed by HMACsig 309 and bandwidth controller 307. The HMAC frame multiplexer 308 creates the HFC MAC frame accommodating the ATM cells received from the ATM cell processor 305 to transfer over the HFC network in accordance with IEEE 802.14 MAC protocol in coordination with control and signaling instructions received from slave bandwidth controller 307 and HMACsig 309 functional entity. Similarly, the HMAC frame demultiplexer 306 demultiplexes the HFC MAC frame received from the HFC access network, recovers the ATM cells and sends to the ATM cell processor 305 for transferring to the MPC in accordance with IEEE 802.14 MAC protocol in coordination with control and signaling instructions received from bandwidth controller 307 and HMACsig 309 functional entity.

Figure 4:
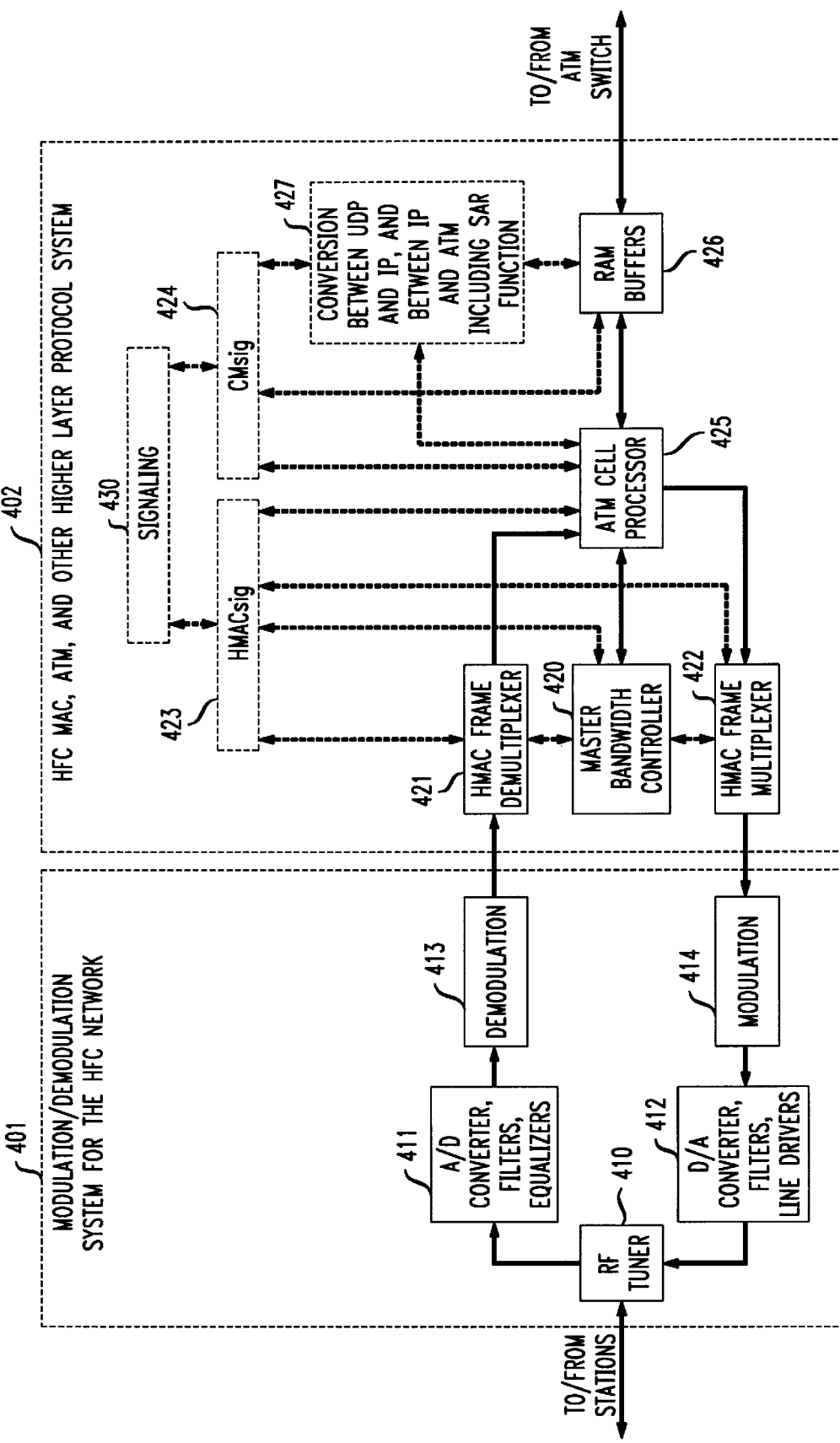
FIG. 4 shows a preferred form of component architecture for an ATM cable modem, in the cable headend that is connected to ATM switches of the ATM network, in accordance with the inventive concepts.

The slave bandwidth controller 307 of the cable modem to be used within a premises network for MPC's acts as a slave of the master bandwidth controller 420 (maintained within the cable modem of the headend, as illustrated in FIG. 4) for the purpose of bandwidth allocation and call admission decisions that are specified in IEEE 802.14 HFC MAC protocol. The HMACsig 309 functional entity executes the control and signaling schemes specified in IEEE 802.14 HFC MAC protocol: source and destination addresses, frame synchronization, slots with contention and reservation schemes, upstream and downstream bandwidth requests, results of contention based transmission attempts, and payload type: data and HFC MAC management information, request for additional transmission bandwidth, acknowledgment, status, and other control and signaling information. The HMAC frame may contain both actual data (application) data and HFC MAC control (management) information for both upstream and downstream of HFC networks in accordance with IEEE 802.14 standards.

Still referring to FIG. 3, the modulation/demodulation system 302 of the cable modem to be used within a premises network for MPC's has five functional entities: modulation 320, demodulation 321, digital to analog converter, filters, and line drivers 322, analog to digital converter, filters, and equalizers 323, and radio frequency tuner 324. Modulation entity 320 modulates the HMAC frame received from the HMAC frame multiplexer 308 in accordance with IEEE 802.14 HFC MAC protocol, while D/A converter, filters, and line drivers 322 perform the conversion of the digital signal into appropriate analog form as specified in IEEE 802.14 HFC MAC protocol. A/D converter, filters, and equalizers 323 converts the analog signal received from the HFC cable network in digital bit streams as specified in IEEE 802.14 HFC MAC protocol, while demodulation entity 321 demodulates the digital signal and recovers the HMAC frame as specified in IEEE 802.11 HFC MAC protocol, and sends the recovered HMAC frame to the HMAC frame multiplexer 306 for further processing. Finally, radio frequency (RF) tuner 324 tunes the channel between 5 MHz and 750 MHz in accordance with IEEE 802.14 HFC MAC protocol. FIG. 4 illustrates the component architecture of a cable modem to be used within a headend station connected to the ATM network. There are two functional blocks: a modulation/demodulation system for the hybrid fiber coaxial (HFC) network 401 and hybrid fiber coaxial (HFC) medium access control (MAC), ATM, and other higher layer protocol system 402. These two functional entities 401 and 402 are logical, and can be implemented either in a single physical entity or in two separate physical entities. For example, a single HFC MAC, ATM, and other higher layer protocol system 402, of a given headend station, can be made a separate physical entity to which a plurality of modulation/demodulation systems 401 can be connected, to provide economies of scale via multiplexing. Similarly, a single modulation-demodulation system for the HFC network 401 unit can be connected to a plurality of cable modems of premises networks (shown in FIG. 3) to provide economies of scale via multiplexing. However, the two distinct logical entities 401 and 402 will act as a single cable modem entity of a headend station when all functions are executed in accordance with the scheme described below.

More particularly, the modulation/demodulation system for the HFC network 401 has five functional entities: radio frequency (RF) tuner 410, digital to analog converter, filters, and line drivers 412, analog to digital converter, filters, and equalizers 411, modulation 414, and demodulation 413. RF tuner 410 tunes the channel between 5 MHz and 750 MHz in accordance with IEEE 802.14 HFC MAC protocol. A/D converter, filters, and equalizers 411 convert the analog signal received from the HFC cable network into digital bit streams as specified in IEEE 802.14 HFC MAC protocol, while demodulation entity 413 demodulates the digital signal and recovers the HMAC frame as specified in IEEE 802.14 HFC MAC protocol and sends the recovered HMAC frame to the HMAC flame multiplexer 421 for further processing. D/A converter, filters, and line drivers 412 perform the conversion of the digital signal into appropriate analog form as specified in IEEE 802.14 HFC MAC protocol, while modulation entity 414 modulates the HMAC frame received from the HMAC frame multiplexer 422 in accordance with the scheme specified in IEEE 802.14 HFC MAC protocol.

In addition, there are eight functional entities in the hybrid fiber coaxial (HFC) medium access control (MAC), ATM, and other higher layer protocol system 402 of the cable modem of the headend station: HMAC frame demultiplexer 421, HMAC frame multiplexer 422, master bandwidth controller 420, ATM cell processor 425, random access memory (RAM) buffers 426, HMACsig 423, CMsig 424, and conversion between user data protocol (UDP) and internet protocol (IP), and between IP and ATM including segmentation and reassembly (SAR) function 427. D Demultiplexer 421 demultiplexes the HFC MAC frame from the bit streams received from the demodulator 413 in accordance with IEEE 802.14 MAC protocol in coordination with control and signaling instructions received from master bandwidth controller 420 and HMACsig 423, and then sends the recovered ATM cells to the ATM cell processor 425. Similarly, HMAC frame multiplexer 422 creates the HFC MAC frame accommodating the ATM cells received from the ATM cell processor 425 to transfer over the HFC network after modulation 414, in accordance with IEEE 802.14 MAC protocol in coordination with control and signaling instructions received from master bandwidth controller 420 and HMACsig 423, and then transfers the HMAC frame for modulation 414 after encapsulation of the ATM cells received from the ATM cell processor 425.

Still referring to FIG. 4, master bandwidth controller 420 acts as a master controller for slave bandwidth controllers 307 of all cable modems of premises networks (shown in FIG. 3) for the purpose of bandwidth allocation and call admission decisions that are specified in IEEE 802.14 HFC MAC protocol. HMACsig 423 will execute the control and signaling schemes specified in IEEE 802.14 HFC MAC protocol: source and destination addresses, frame synchronization, slots with contention and reservation scheme, upstream and downstream bandwidth request, results of contention based transmission attempts, payload type: information bit streams and HFC MAC management information, request for additional transmission bandwidth, acknowledgment, status, and other control and signaling information. The HMAC frame may contain both actual data (application) data and HFC MAC control (management) information for both upstream and downstream of HFC networks in accordance with IEEE 802.14 protocol.

ATM cell processor 425 handles the ATM cells to and from RAM buffers 426, transfers ATM cells to the HMAC frame multiplexer 422 for creating an HMAC frame for sending over the HFC network and receives ATM cells from the HMAC frame demultiplexer 421 for transferring ATM cells to the rest of the world via the ATM network 160 (see FIG. 1) in accordance with schemes directed by HMACsig 423, CMsig 424 and master bandwidth controller 420. If the traffic comes from the HFC access network for transferring to the ATM network 160, RAM buffers 426 store the traffic received from the ATM cell processor 425 as ATM cells (defined in accordance with the ATM Forum standard) and then transfer the ATM cells to the ATM switch as indicated by CMsig 424.

CMsig 424 executes the control and signaling scheme for initialization of the multimedia conference call and establishment of virtual connections for transferring of actual multimedia traffic over HFC cable networks and the ATM network 160 in accordance with an aspect of the invention. Table 2 provides a preferred form of CMsig control and signaling protocol messages that will be used in conjunction with HMACsig control and signaling protocol messages of IEEE 802.14 HFC MAC protocol in accordance with this aspect of the invention.

TABLE 2

CMsig Control and Signaling Protocol Messages

| Control and Signaling messages | Description |
|---|---|
| CM-ARQ | admission request message for the hybrid networking environment that contains HFC access network and the ATM network |
| CM-ACF | confirmation of the admission request message for the hybrid networking environment that contains HFC access network and the ATM network |
| CM-ARJ | rejection of the admission request message for the hybrid networking environment that contains HFC access network and the ATM network |
| CM-setup | setup request for the virtual connection over the HFC access network having ATM cable modem |
| CM-connect | connection request for the virtual connection over the HFC access network having ATM cable modem |
| CM-call-proceeding | connection request for the virtual connection over the HFC access network having ATM cable modem is proceeding |
| CM-call-reject | connection request for the virtual connection over the HFC access network having ATM cable modem is proceeding is rejected |
| CM-call-alerting | alert message for the connection request for the virtual connection over the HFC access network having ATM cable modem |

Referring back to FIG. 4, functional entity 427 provides conversion between the user data protocol (UDP) and the internet protocol (IP) and between internet protocol (IP) and asynchronous transfer mode (ATM) protocol, along with segmentation and reassembly function (as defined in the ATM Forum standard). If the traffic comes from the HFC network for transferring over the ATM network 160 and the conversion between the UDP/IP and ATM protocol is needed, the ATM cell processor 425 sends the traffic to the protocol conversion entity 427, and the conversion entity 427 communicates with CMsig 424 as needed based on the CMsig control and signaling protocol scheme of this invention. If it is needed, CMsig 424 will send CMsig control and signaling protocol messages to the protocol conversion entity 427 encapsulating the messages into user data protocol (UDP). Protocol conversion entity 427 then converts the user data protocol (UDP) into internet protocol (IP) and encapsulates the IP over the asynchronous transfer mode (ATM) protocol including segmentation and reassembly (SAR) function in accordance with the Internet Engineering Task Force (IETF) and ATM Forum standards, and the ATM cells are then transferred to ATM buffers 426 for sending over the ATM switch/node of the ATM network 160. Similarly, reverse processes take place if the protocol conversion services are required for traffic that is sent from the ATM switch/node of the ATM network 160 to HFC cable networks.

FIG. 5 illustrates the protocol stacks of the ATM cable modem of a premises network. Protocol stack 501 is used when HMACsig control and signaling protocol messages of IEEE 802.14 HFC MAC protocol is transferred, while protocol stack 502 is used when actual information, other than HMACsig control and signaling messages, are transferred over the cable modem of a premises network. HMACsig messages are terminated to the ATM cable modem of the premises network and are not transferred to the MPC. In protocol entity 501, it is shown that HMACsig messages are encapsulated over the ATM adaptation layer (AAL) protocol using segmentation and reassembly (SAR) function and ATM cells in accordance with the ATM Forum standard. The ATM cells are then encapsulated in IEEE 802.14 HFC MAC (HMAC) protocol for transferring over the HFC cable network. In protocol entity 502, there are two separate protocol stacks: logical link control (LLC), medium access control (MAC), and physical layer 520, and ATM adaptation layer (AAL), asynchronous transfer mode (ATM) protocol, and IEEE 802.14 hybrid fiber coaxial (HFC) medium access control (MAC) protocol (HMAC), and physical layer 521. The protocol entity 520 (LLC, MAC) is used for communication between the ATM cable modem and the MPC of the premises network via the local area network interface, while the protocol entity 521 (AAL, ATM, HMAC) is used for communication between the ATM cable modem of the premises network and the cable modem of the headend station via the HFC cable network.

FIG. 6 shows a preferred form of the protocol stacks of the ATM cable modem of the headend. Protocol stack 601 is used when HMACsig control and signaling protocol messages of the IEEE 802.14 HFC MAC protocol, CMsig control and signaling protocol messages in accordance with the invention, and H.225.0 control and signaling messages of the ITU-T H.323 protocol standards, are transferred, while protocol stack 602 is used when actual information, other than the control and signaling messages (set out above), are transferred over the ATM cable modem of the headend station. In protocol entity 601, it may be noted that the HMACsig 614 control and signaling messages are used over the protocol entity 611 (AAL, ATM, HMAC) between the ATM cable modem of the premises network and the ATM cable modem of the headend station to implement the IEEE 802.14 HFC MAC protocol standard for communication over the HFC cable network, while H.225.0 and CMsig 613 control and signaling protocol messages are used on end-to-end basis over the protocol entity 612 (user data protocol [UDP]/transmission control protocol [TCP], IP, AAL, ATM). However, signaling entity 610 is an intelligent mechanism that has been devised in accordance with this invention for any inter-signaling communication between the HMACsig of IEEE 802.14 HFC MAC (HMAC) protocol standard, CMsig as defined in accordance with this invention, and H.225.0 of the ITU-T H.323 protocol standards.

Still referring to FIG. 6, protocol entity 602 is used for transferring information between the ATM cable modem of the premises network and the headend station over the HFC network, as well as over the ATM network 160, for transferring information other than the HMACsig, H.225.0, and CMsig control and signaling protocol information. More specifically, protocol entity 603 (AAL, ATM, HMAC) is used for transferring information between the ATM cable modem of the premises network and the headend station over the HFC network, while the protocol entity 604 (IP, AAL, ATM) is used for transferring information between the ATM cable modem of the headend station and the ATM switch/node of ATM network 160.

Figure 7:
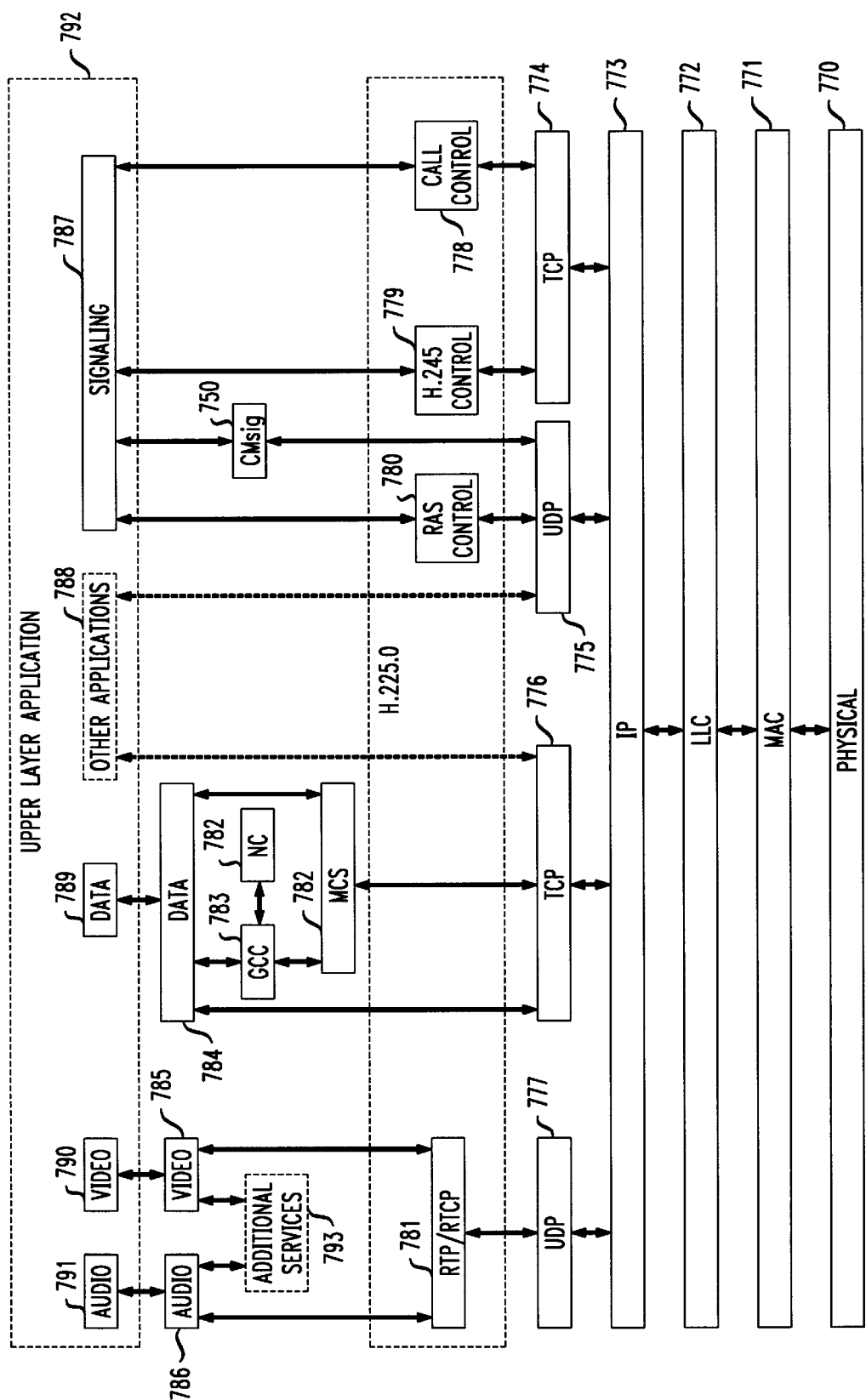
FIG. 7 shows a preferred form of protocol architecture for a multimedia personal computer/workstation that uses ATM cable modem control and signaling schemes in accordance with the inventive concepts.

In FIG. 7, the protocol architecture of the MPC (MPC 101-1 or 101-2 of FIG. 1) is shown. The LAN-based computer uses H.323 protocol. Each MPC (101-1, 101-2) of the ATM cable modem-based premises networks (170-1, 170-2) is augmented with the CMsig 750 control and signaling protocol scheme to adapt with circumstances for taking advantage of the hybrid fiber coaxial (HFC) cable network that uses IEEE 802.14 HFC MAC (HMAC) protocol.

Figure 8:
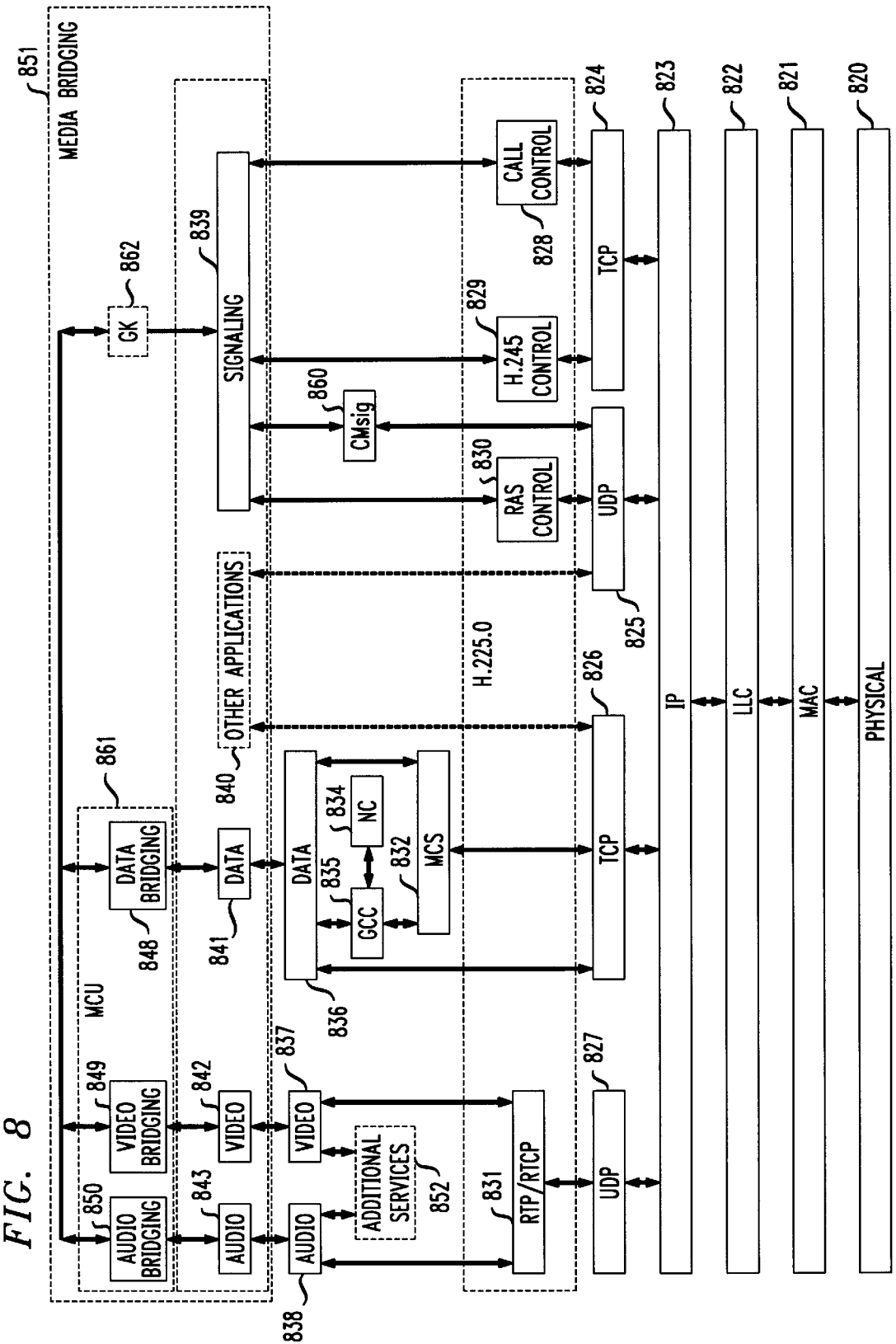
FIG. 8 shows a preferred form of protocol architecture for a switched local area network hub (SLH)-based (access or central) multimedia bridge server that uses ATM cable modem control and signaling schemes in accordance with the inventive concepts.

In FIG. 8, the protocol architecture of the access multimedia bridge server (131 or 132 of FIG. 1) or central multimedia bridge server (134) is shown. The protocol architecture of this server is based on ITU H.323 protocol that contains multipoint control unit (MCU) and gatekeeper (GK) functions in addition to various other functionalities. However, multimedia bridge servers (131, 132, and 134) have been augmented with the CMsig 860 control and signaling protocol scheme to adapt to the circumstances for taking the advantage of the hybrid fiber coaxial (HFC) cable network that uses IEEE 802.14 HFC MAC (HMAC) protocol in accordance with the invention.

Figure 9:
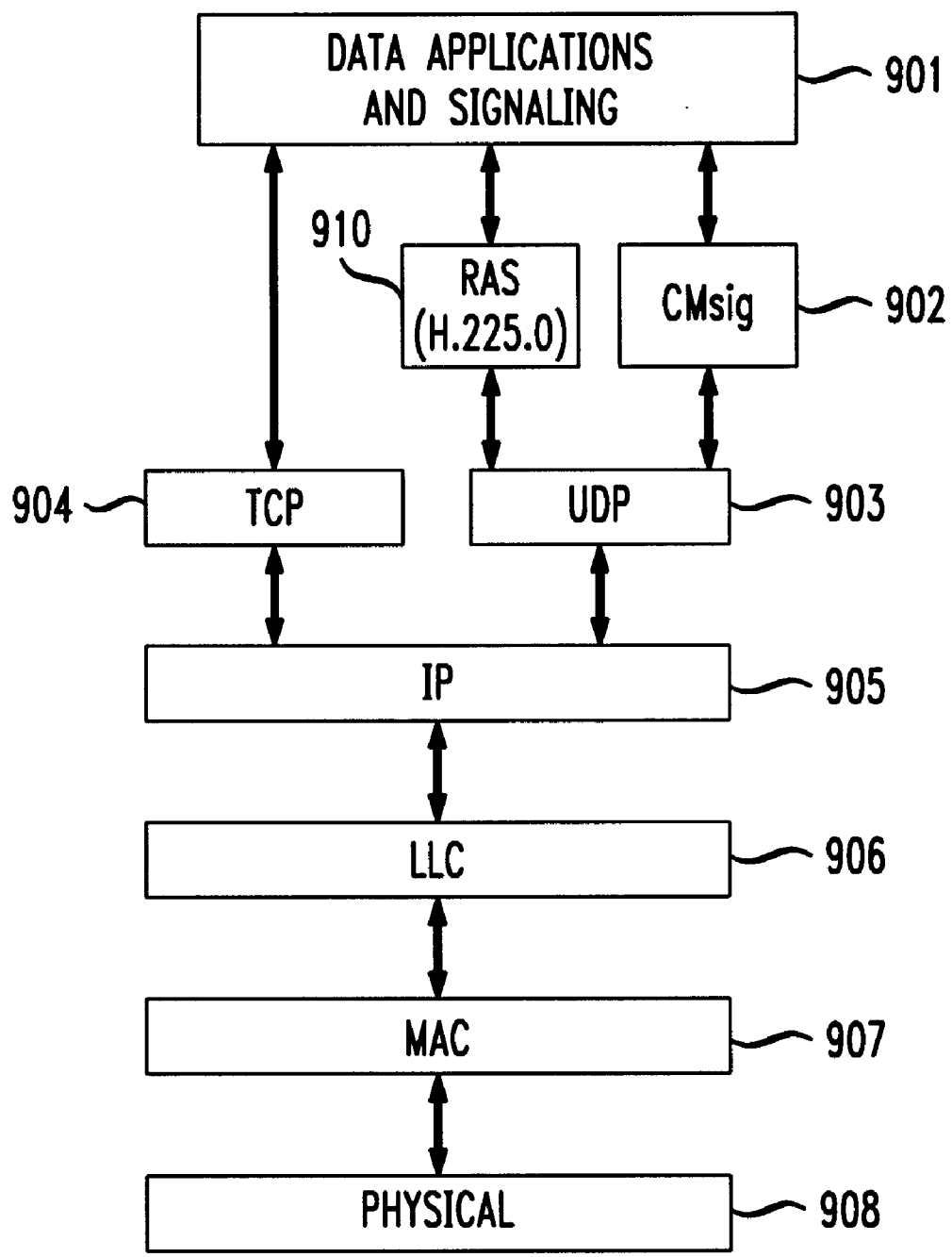
FIG. 9 shows a preferred form of protocol architecture for a switched local area network hub (SLH)-based cable modem server (or central ATM network server) that uses cable modem control and signaling schemes in accordance with the inventive concepts.

In FIG. 9, the protocol architecture for a cable modem server (130 or 133) or a central ATM network server (135) is shown. The protocol architecture consists of data applications and signaling layer 901, CMsig 902, RAS 910 of ITU-T H.323 (H.225.0) signaling protocol, TCP 904, user data protocol (UDP) 903, internet protocol (IP) 905, logical link control (LLC) 906, and MAC 907. With the exception of CMsig 92, which is novel, all protocols are based on standards. All servers (130, 133, 135) are augmented with CMsig 902 control and signaling protocol, in accordance with the invention, to meet the special requirements for communication in a hybrid fiber coaxial (HFC) cable network that uses IEEE 802.14 HFC MAC (HMAC) protocol. Table 3, below, depicts a preferred form of a bandwidth table that is maintained by each cable modem server for the networking scheme.

TABLE 3

Bandwidth Table of the Cable Modem Server

| Headends | Fibers for each Headend | Coaxial Cables for each Fiber | Premises Networks connected to each coaxial cable | Devices within a given Premises Network | Upstream Bandwidth for each Application of a given Device | Down-stream Bandwidth for each Application of a given Device |
|---|---|---|---|---|---|---|
| Headend 1 | Fiber 1 | Coax 1 | Premises Network 1 | Device 1 | Upstream bandwidth 1.... | Downstream bandwidth 1..... |
| | | | | | Upstream bandwidth N | Downstream bandwidth N |
| | | | | Device M | Upstream bandwidth 1... | Downstream bandwidth 1... |
| | | | | | Upstream bandwidth K | Downstream bandwidth K |
| | | | Premises Network W | Device 1 | Upstream bandwidth 1... | Downstream bandwidth 1... |
| | | | | | Upstream bandwidth X | Downstream bandwidth X |
| | | | | Device Y | Upstream bandwidth 1 | Downstream bandwidth 1... |
| | | | | | Upstream bandwidth Z... | Downstream bandwidth Z.... |
| | | Coax L | | Device 1 | Upstream bandwidth 1... | Downstream bandwidth 1... |
| | | | | | Upstream bandwidth P... | Downstream bandwidth P... |
| | | | | Device M | Upstream bandwidth 1 | Downstream bandwidth 1... |
| | | | | | Upstream bandwidth K... | Downstream bandwidth K... |
| | | | | | Upstream bandwidth S | Downstream bandwidth S |
| | ...Fiber T | ....... | ....... | ....... | ....... | ....... |
| Headend U | ....... | ....... | ....... | ....... | ....... | |

Figure 10:
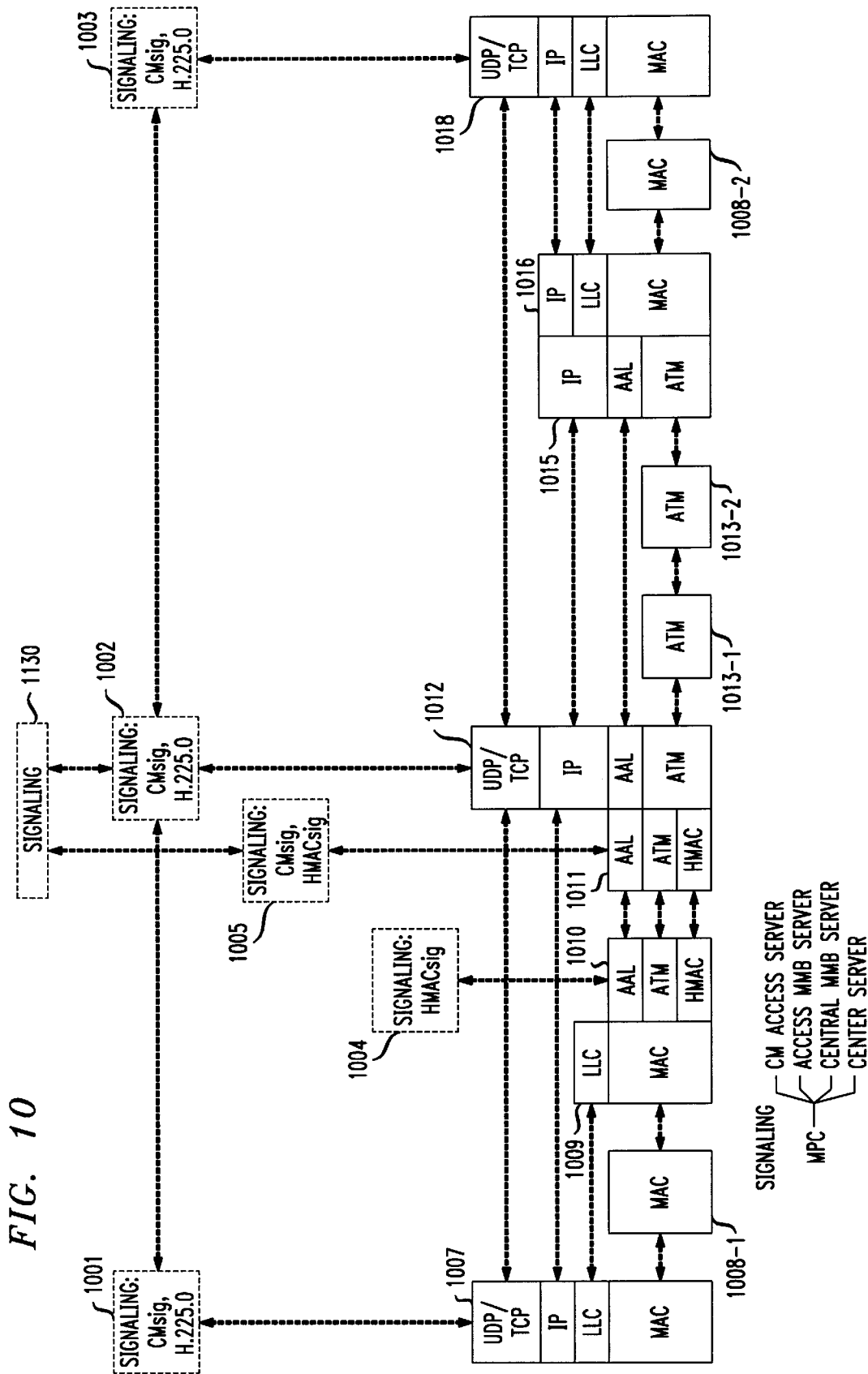
FIG. 10 shows a preferred form of high-level end-to-end protocol architecture for communication (for control and signaling only) between a multimedia personal computer/ workstation and a cable modem access server (access multimedia server, central multimedia bridge server, or central server) in accordance with the inventive concepts.

In FIG. 10, protocol architecture for end-to-end communications for transferring control and signaling messages (CMsig, HMACsig, and H.225.0) between the MPC (101-1, 101-2, 101-3, or 101-4), ATM cable modems of premises networks and headend stations, and ATM network based servers (cable modem servers [130, 133], access multimedia bridge servers [131, 132], central network server 135, central multimedia bridge server 134) via switched local area network hub (102-1, 102-2, 102-3, 102-5, 102-6, 102-7, 102-8, 102-9, or 102-10), ATM nodes/switches (120-1, 120-2, 121-1, 121-2, 121-3), and ATM routers (106-1, 106-2, 106-3, 106-4, 106-5, 106-6, 106-7, 106-8) of the ATM wide area network 160 is explained. The protocol stack 1007 running on computer 101-1, 101-2, 101-3, or 101-4, has H.323 standard-based entities (along with CMsig and H.225.0 control and signaling 1001 schemes); (note that other architectural entities, such as generic conference control (GCC), node controller (NC), and multipoint communications service (MCS) of H.323 protocol have not been shown for simplicity). The protocols UDP/TCP and IP are used for encapsulation of the control and signaling messages in accordance with the IETF standards, while LLC and MAC protocols are used for communication over the local area network in accordance with IEEE standards. Similarly, protocol stack 1008-1 or 1008-2 is running over the switched local area network hub (102-1, 102-2, 102-3, 102-5, 103-6, 102-7, 102-8, 102-9, or 102-10) in accordance with IEEE standards.

Still referring to FIG. 10, networking protocol stacks 1009 and 1010, and signaling (HMACsig) protocol 1004, are running on the ATM cable modem of the premises network. Protocol stack 1009 of the ATM cable modem is used for communication with the MPC via the switched local area network, while protocol stacks 1004 and 1010 are used for communication with the ATM cable modem of the headend station via the HFC cable network.

Signaling protocol stacks (1130, 1005, and 1002), and transport and networking protocol stacks (1012 and 1011) are used in ATM cable modems of headend stations. Signaling protocols (1130 and 1005 [CMsig and HMACsig]) and networking protocols 1011 (AAL, ATM, HMAC) are used for communication with the ATM cable modem of the premises network via the HFC cable network. However, signaling protocols 1130 and 1002 (CMsig, H.225.0) and transport and networking protocols 1012 (UDP/TCP, IP, AAL, ATM) are used for communication with the ATM network-based servers (130, 131, 132, 133, 134, 135) via the ATM wide area network 160. The signaling entity 1130 facilitates communication for inter-signaling communications between HMACsig and CMsig/H.225.0 in accordance with the invention.

ATM protocol entity (1013-1 or 1013-2) is used in the ATM node/switch in accordance with the ATM Forum standards. Protocol entities 1015 (IP, AAL, ATM) and 1016 (IP, LLC, MAC) are used in ATM routers (106-1, 106-2, 106-3, 106-4, 106-5, 106-6, 106-7, 106-8) that connect the switched local area network hub-based server to the ATM network 160, while protocol entity 1008-2 (MAC) is used in the switched local area network hub (102-1, 102-2, 102-3, 102-4, 102-5, 102-6, 102-7, 102-8, 102-9, or 102-10) in accordance with the IEEE standards. The signaling protocol 1003 (CMsig, H.225.0) and the transport and networking protocols (UDP/TCP, IP, LLC, MAC) are used in the ATM network based servers (130, 131, 132, 133, 134, 135).

Figure 11:
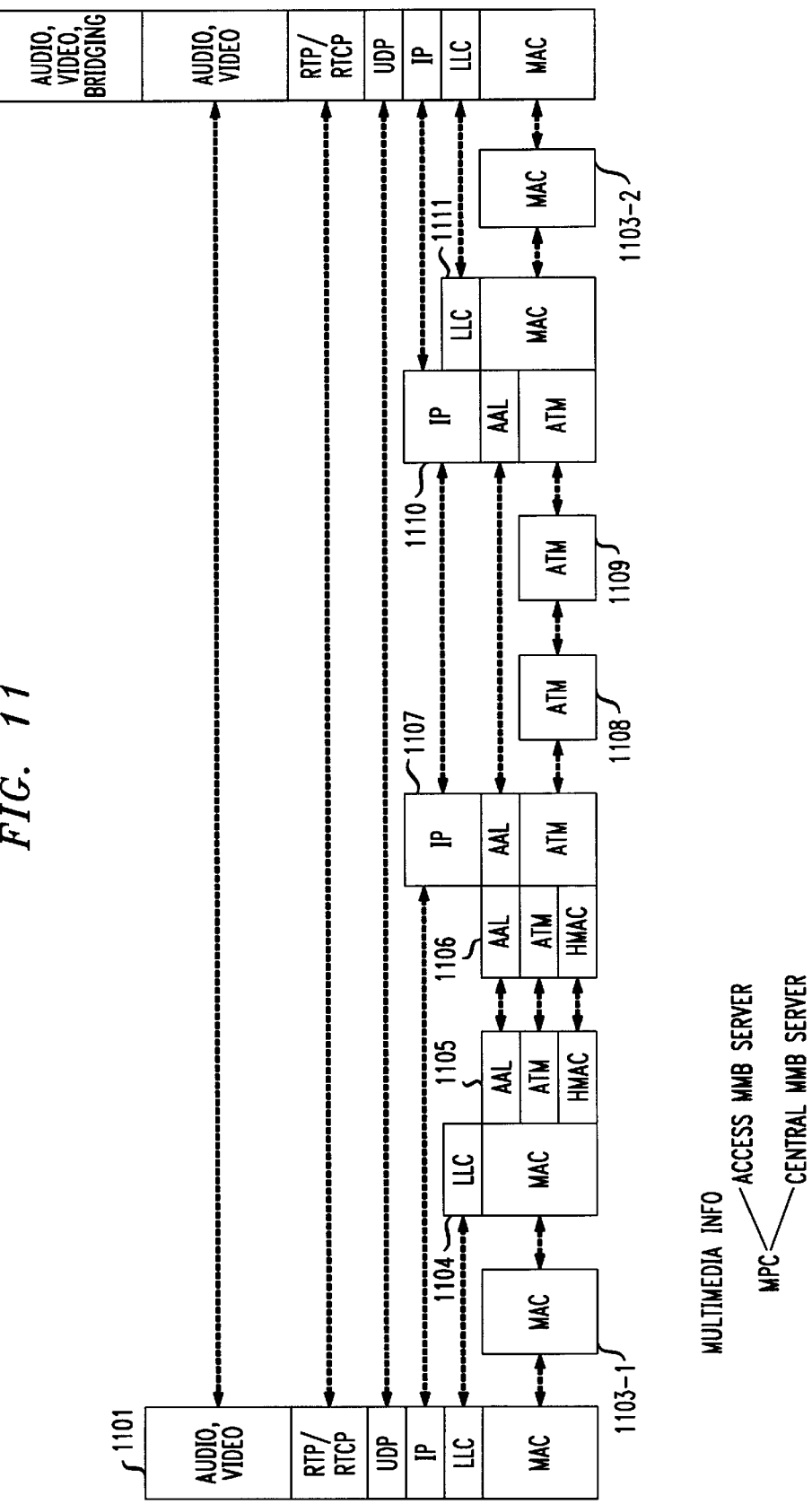
FIG. 11 shows a preferred form of high-level end-to-end protocol architecture, for communication (for audio or video only) between a multimedia personal computer/workstation and an access multimedia bridge server (or central multimedia bridge server) in accordance with the inventive concepts.

In FIG. 11, the protocol architecture for end-to-end communications for transferring of audio and video signals between the MPC (101-1, 101-2, 101-3, or 101-4) and the access or central multimedia bridge server (131, 132, or 134) via ATM cable modems of premises networks and headend stations, switched local area network hub (102-1, 102-2, 102-3, 102-4, 102-5, 102-6, 102-7, 102-8, 102-9, or 102-10), ATM nodes/switches (120-1, 120-2, 121-1, 121-2, 121-3), and ATM routers (106-1, 106-2, 106-3, 106-4, 106-5, 106-6, 106-7, 106-8) of the ATM wide area network 160 is explained. The protocol entities 1101 (audio, video, RTP/RTCP [real-time protocol/real-time control protocol], UDP, IP, LLC, MAC), 1103-1/1103-2 (MAC), 1104 (LLC, MAC)/1105 (AAL, ATM, HMAC), 1106 (AAL, ATM, HMAC)/1107 (IP, AAL, ATM), 1108 (ATM)/1109 (ATM), 1110 (IP, AAL, ATM)/1111 (LLC, MAC), and 1102 (audio/video bridging, audio, video, RTP/RTCP, UDP, IP, LLC, MAC) are used by the MPC, switched local area network hub, ATM cable modem of the premises network, ATM cable modem of the headend station, ATM switch/node, ATM router, and multimedia bridge server, respectively, in accordance with the ITU-T, IETF, IEEE, and ATM Forum standards (as applicable).

Figure 12:
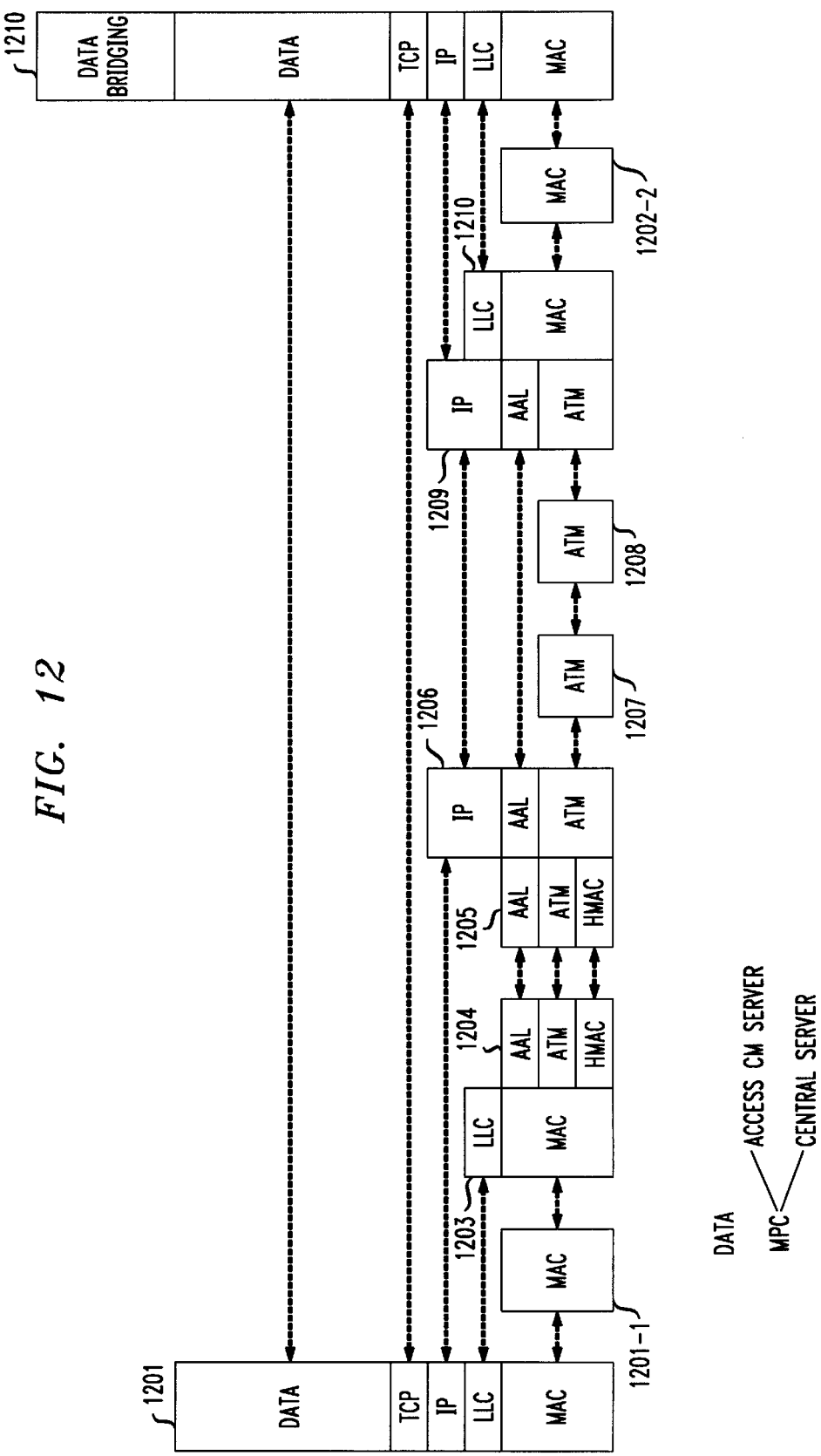
FIG. 12 shows a preferred form of high-level end-to-end protocol architecture, for communication (for data other than control and signaling traffic) between a multimedia personal computer/workstation and a multimedia bridge server (or central multimedia bridge server) in accordance with the inventive concepts.

Finally, in FIG. 12, the protocol architecture for end-to-end communications for transferring of data signals between the MPC (101-1, 101-2, 101-3, or 101-4) and the access or central multimedia bridge server (131, 132, or 134) via ATM cable modems of premises networks and headend stations, switched local area network hub (102-1, 102-2, 102-3, 102-4, 102-5, 102-6, 102-7, 102-8, 102-9, or 102-10), ATM nodes/switches (120-1, 120-2, 121-1, 121-2, 121-3), and ATM routers (106-1, 106-2, 106-3, 106-4, 106-5, 106-6, 106-7, 106-8) of the ATM wide area network 160 is explained. The protocol entities 1201 (data, TCP, IP, LLC, MAC), 1202-1/1202-2 (MAC), 1203 (LLC, MAC)/1204 (AAL, ATM, HMAC), 1205 (AAL, ATM, HMAC)/1206 (IP, AAL, ATM), 1207 (ATM)/1208 (ATM), 1209 (IP, AAL, ATM)/1210 (LLC, MAC), and 1210 (data bridging, data, TCP, IP, LLC, MAC) are used by the MPC, switched local area network hub, ATM cable modem of the premises network, ATM cable modem of the headend station, ATM switch/node, ATM router, and multimedia bridge server, respectively, in accordance with the ITU-T, IETF, IEEE, and ATM Forum standards (again, as applicable).

Figure 13:
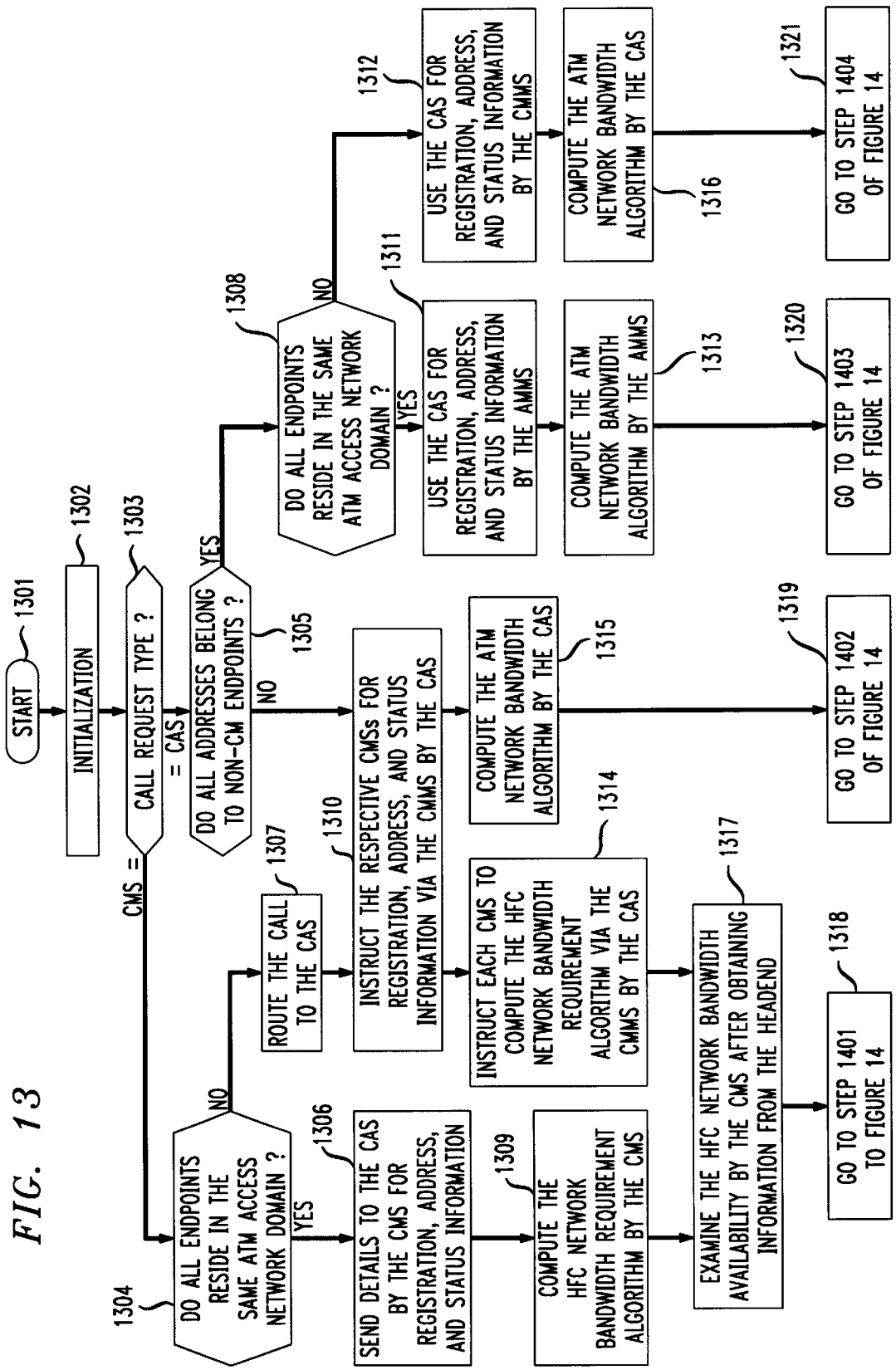
FIGS. 13 and 14 are flow diagrams of one form of a multimedia call control algorithm to set up multimedia communications between participants over an HFC cable network (using ATM cable modems to interconnect the premises networks) and an ATM wide area network, using cable modem control and signaling protocol in accordance with the inventive concepts.
Figure 14:
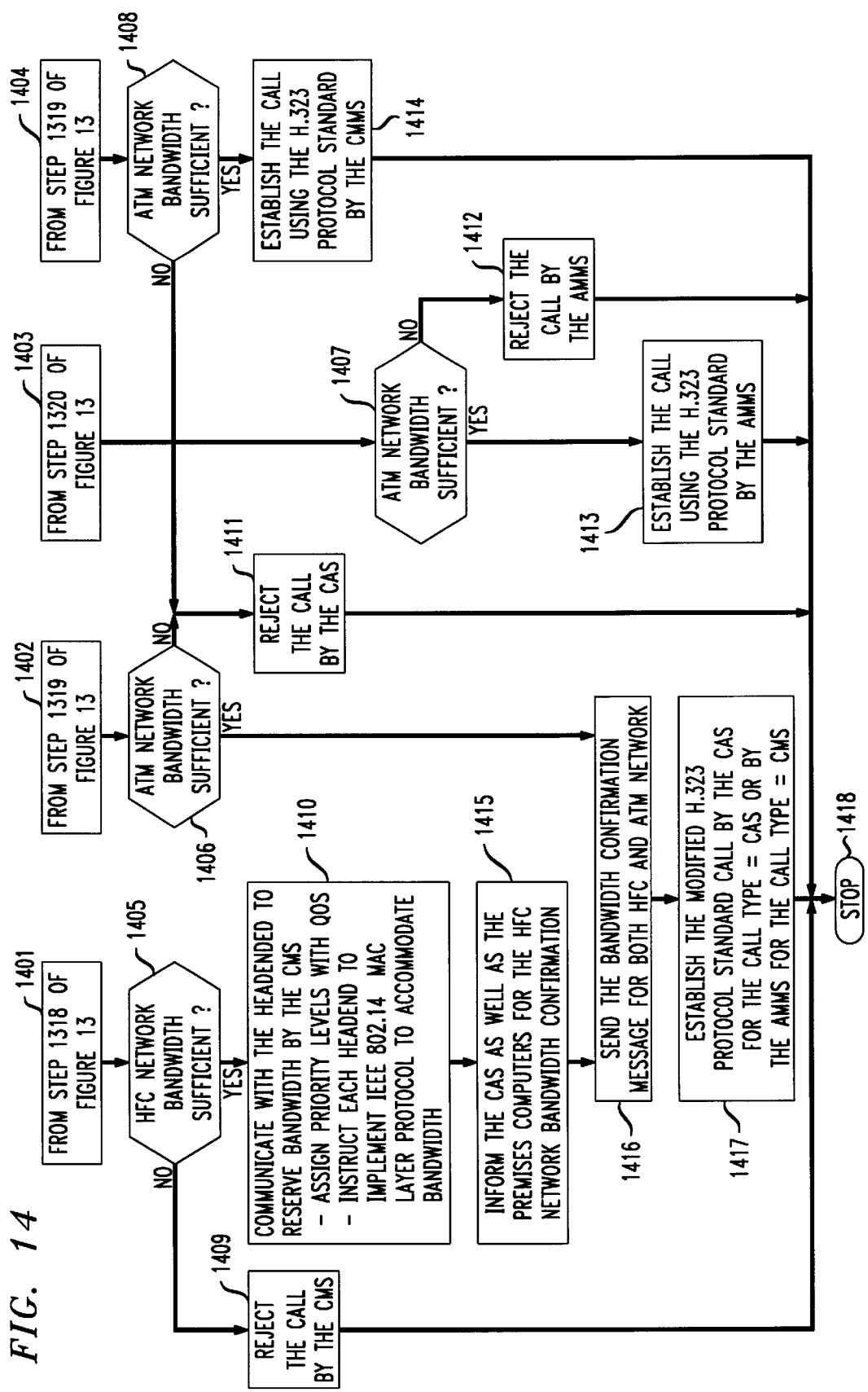

In FIGS. 13 and 14, a flow chart of a preferred form of real-time multipoint, multimedia conference and collaborative services integrated with a hybrid fiber coaxial cable network using the ATM cable modems and the ATM wide area network 160 is shown in accordance with the invention. The CMsig control and signaling protocol messages have been developed as a feature of the invention and the messages shown in Table 2 are used to implement the flowcharts of FIGS. 13 and 14 in accordance with this invention.

Figure 15:
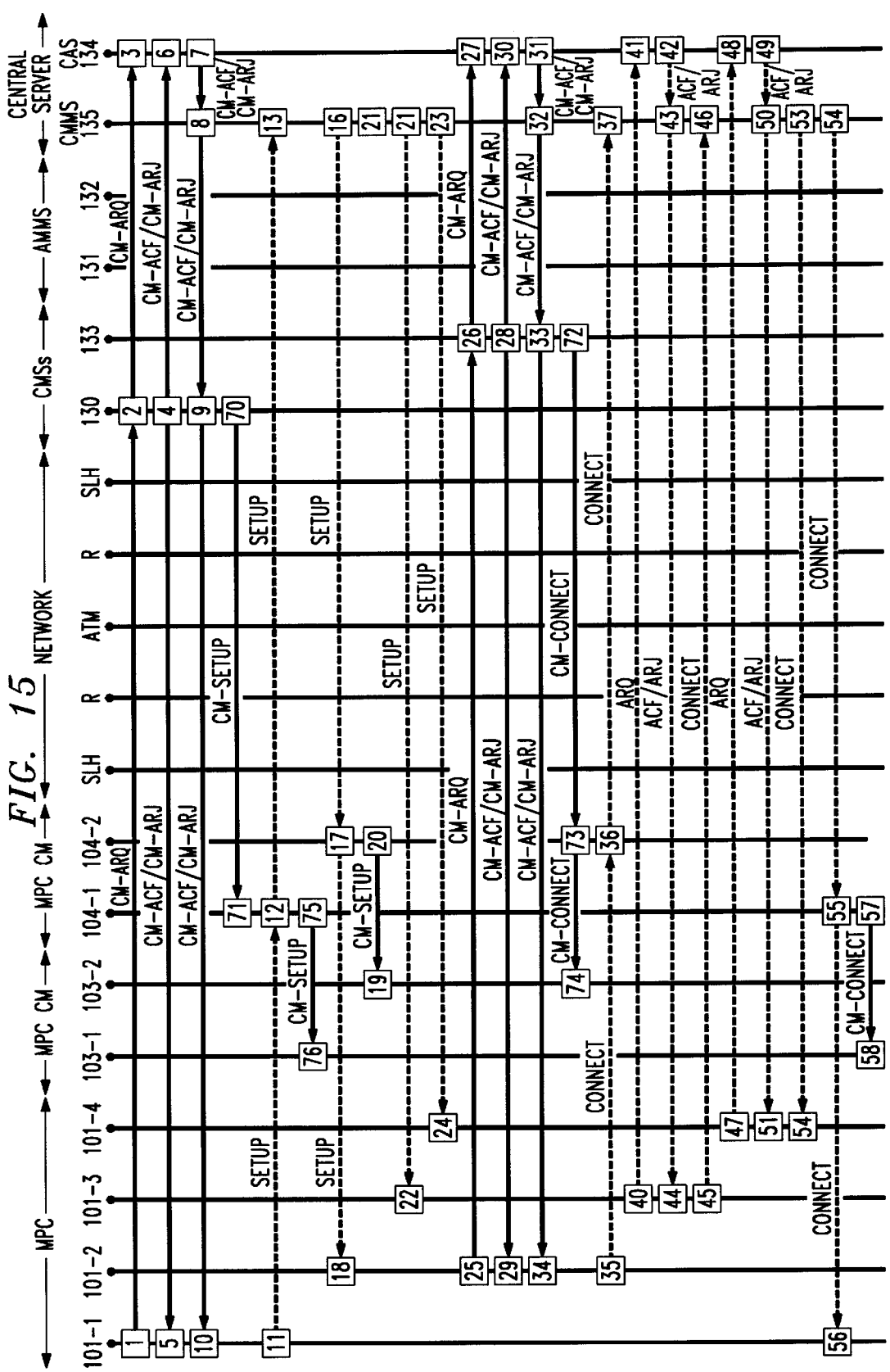
FIG. 15 presents an example of multimedia control and signaling message flows in accordance with the inventive concepts.

FIG. 15 illustrates high-level examples of CMsig control and signaling protocol message flows (along with other standard-based signaling messages) when the flowcharts shown in FIGS. 13 and 14 are executed. Assume that every conferee, known as calling party or calling participant, sets up communication for multipoint multimedia conferencing either via a cable modem server (CMS) [130, 133] of the ATM access network domain (148, 149), if the calling party resides in the ATM cable modem server-based premises network (170-1, 170-3), or, via the central ATM network server 135 of the ATM backbone network domain, if the calling party resides in the non-cable modem premises network (170-2, 170-4). If all the conferencing parties remain in the same ATM access network domain, the bridging is performed by the access multimedia bridge server of that ATM access network domain after initialization of the multimedia call via the cable modem server of that ATM access network domain, and no involvement of the central ATM network server 135 and central multimedia bridge server 134 of the ATM backbone network domain is required (however, the cable modem server [130, 133] will inform the central ATM network server 135 that a conference is taking place in the access network domain and will send the details of the conference to that server for updating the status of the network in a central location). If the parties are not all in the same ATM access network domain, the involvement of the central ATM network server 135 and the central multimedia bridge server 134 of the ATM backbone network domain is required, in addition to the involvement of the cable modem servers of the different ATM access network domains, and multimedia bridging is performed by the central multimedia bridge server 134, without the involvement of any access multimedia bridge servers of any ATM access network domains. In either situation, a point-to-point communication flow is set up between a multimedia bridge server and each end station participating in the conference (e.g., MPC's 101-1 through 101-4) via the hybrid coaxial cable network and the ATM wide area network 160. The bridging will be performed in accordance with the criteria setup at the time of conference call (e.g., a bridge [131, 132, or 134] can provide either video switching or video mixing, which are known to those in the art). In addition, the bridge will include functions such as GCC, NC, and MCS, as specified in the ITU Rec. T-series protocol standards, as well as CMsig control and signaling protocol messages, in accordance with this invention.

Again referring to FIGS. 13 and 14, the process starts in Step 1301, and initialization is performed in Step 1302 by the MPC (101-1, 101-2, 101-3, or 101-4) to set up the multimedia conference to create a collaborative data application in real-time, with guaranteed performance, in a hybrid communication environment, using hybrid fiber-coaxial cable access networks and the ATM wide area network 160. At this point the MPC initializes the CM-ARQ control and signaling message of the CMsig scheme (e.g., Steps 1 to 2 of FIG. 15), and the process proceeds to Step 1303. In Step 1303, it is determined whether the call has been received by the cable modem server (CMS) [130, 133] of the ATM access network domain (e.g., Step 2 of FIG. 15) or by the central ATM network server (CAS) [135] (e.g., Steps 40 and 41 of FIG. 15). If the call is received by the central ATM network server (CAS) 135, the process proceeds to Step 1305, otherwise, the process proceeds to Step 1304 if the call is received from the cable modem server (CMS) [130, 133].

In Step 1304, it is determined by the cable modem server (CMS) [130, 133] whether the addresses of all calling and called end points of the conference call (e.g., Step 2 of FIG. 15) reside in the same ATM access network domain. If the determination is affirmative, the process continues to Step 1306, otherwise, the process continues to Step 1307. In step 1306, the cable modem server (CMS) [130, 133] sends the details of the conference to the central ATM network server (CAS) 135 using CM-ARQ message (e.g., Steps 2 to 3 of FIG. 15) for updating the information related to registration, address, and status, although the conference will be confined within the ATM access network domain (148, 149). The process then proceeds to Step 1309, where the cable modem server (CMS) [130, 133] computes the bandwidth requirement algorithm for the hybrid fiber coaxial (HFC) cable network, along with the availability of resources in the ATM access node/switch (120-1, 120-2). Note that a cable modem server (CMS) [130 or 133] always sends bandwidth confirmation (CM-ACF) or rejection (CM-ARJ) message (e.g., Steps 4 to 6 of FIG. 15) for the hybrid fiber coaxial (HFC) cable network, as soon as it determines that it has sufficient information to make the decision, either before or after communication with the central ATM network server (CAS) 135.

If the addresses of all calling and called end points do not reside in the same ATM access network domain, in Step 1307, the cable modem server (CMS) [130, 133] routes the call of the calling party to the central ATM network server (CAS) 135, by relaying the CM-ARQ control and signaling message of the CMsig scheme (e.g., Steps 2 and 3 of FIG. 15), and the process proceeds to Step 1310, where the central ATM network server (CAS) 135 examines the details of the conference participating parties and determines whether there are cable modem and non-cable modem-based premises network end points (e.g., Step 3 of FIG. 15). The central ATM network server (CAS) 135 instructs the details for registration, address, and status information to the corresponding the cable modem server (CMS) [130, 133], via the central multimedia bridge server (CMMS) 134, of the ATM backbone network domain 150, using the CM-ACF or CM-ARJ message of the CMsig control and signaling protocol scheme (e.g., Steps 7 through 9). As mentioned earlier, each multimedia bridge server (131, 132, 134) will have an entity known as gatekeeper (GK) as envisioned in the ITU-T H.323 protocol standard, and the capability of the same gatekeeper, in accordance with this invention, is also extended to handle the CMsig control and signaling protocol messages for providing multimedia conferencing services in hybrid networking environment that includes both the hybrid fiber coaxial cable (HFC) access network equipped with ATM cable modems and the ATM wide area network 160 (e.g., CMsig control and signaling protocol messages used in conjunction with ITU-T H.323 protocol's control and signaling messages in Steps 1 through 58 of FIG. 15). The process is then divided into two steps: Step 1314, for computation of the bandwidth availability in the hybrid fiber coaxial (HFC) cable network by the cable modem server (CMS) [130, 133], and Step 1315, for computation of the bandwidth within the ATM wide area network 160 by the central ATM network server 135. The algorithm used for the actual bandwidth computation, either for the hybrid fiber coaxial (HFC) access network or for the ATM wide area network 160, is not part of the invention.

More particularly, in step 1314, the central ATM network server (CAS) 135 instructs the central multimedia bridge server (CMMS) 134 to request that the cable modem server (CMS) [130, 133], of the respective ATM network domain (148, 149), compute the respective bandwidth requirement algorithm for the HFC access network, using CM-ACF or CM-ARJ control and signaling messages of the CMsig control and signaling protocol scheme (e.g., Steps 7 through 9 and Steps 31 through 33 of FIG. 15). The process then continues to Step 1317, where the cable modem server (CMS) [130, 133] of the respective ATM network domain (148, 149), communicates with the ATM cable modem of the headend station, to connection setup using CM-setup message of the CMsig control and signaling scheme (e.g., Steps 70 and 71 of FIG. 15) after determining that the bandwidth of the HFC cable access network is available, based on the information already obtained, since the ATM cable modem of the headend station will be allocating the bandwidth of the HFC cable network to all users using the IEEE 802.14 HFC MAC (HMAC) protocol standard. The process then proceeds to Step 1405 of FIG. 14 (via Steps 1318 of FIG. 13 and Step 1401 of FIG. 14). In Step 1315, the central ATM network server (CAS) 135 itself computes the ATM network bandwidth requirement algorithm, and the process jumps to Step 1406 of FIG. 14 (via Steps 1319 of FIG. 13 and Step 1402 of FIG. 14).

Once again, if a determination is made that the call has been received by the central ATM network server (CAS) [135] in Step 1303, the process proceeds to Step 1305, where the central ATM network server (CAS) 135 examines whether all the addresses of the conference participants belong to non-cable modem premises networks. If not, the process continues to Step 1310, since the call contains a mixture of both cable modem and non-cable modem-based premises network end points. Otherwise, the process proceeds to Step 1308 where the central ATM network server (CAS) 135 examines whether all the addresses of the conference participants belong to the same ATM access network domain (148 or 149). If so, in Step 1311, the central ATM network server (CAS) 135 is used by the access multimedia bridge server (AMMS) [131, 132] to obtain registration, address, and status information, to set up the multimedia conference call, since all non-cable modem premises network based conference participants remain in the same ATM access network domain (148, 149). The process then continues to Step 1313, where the access multimedia bridge server (AMMS) [131, 132] computes the ATM network bandwidth requirement algorithm with the ATM access network domain (148, 149) for the multimedia conference call and updates the status of the conference call with the central ATM network server 135. The process then jumps to Step 1407 of FIG. 14 (via Step 1320 of FIG. 13 and Step 1403 of FIG. 14).

If a determination was previously made that the end points did not reside in the same ATM access network domain, in Step 1312, the central multimedia bridge server (CMMS) 134 obtains the registration, address, and status information from the central ATM network server (CAS) 135, using the ITU-T H.323 standard based control and signaling messages (e.g., Steps 35 through 54 of FIG. 15), since the conference call will be established by the central multimedia bridge server (CMMS) 134 in non-cable modem premises-based end points environment only. The process then jumps to Step 1408 of FIG. 14 (via Step 1321 of FIG. 13 and Step 1404 of FIG. 14).

In FIG. 14, Step 1405, the cable modem server (CMS) [130, 133] of the given ATM network domain (148, 149) examines whether there is sufficient bandwidth available in the hybrid fiber coaxial (HFC) cable network to accept the multimedia conference call (note that this functionality of the cable modem server enables the design of the ATM cable modem to be less complicated, since it is not involved in the computation of the bandwidth requirement of the HFC network; in addition, the ATM cable modem is also not involved in the processing of CM-ACF or CM-ARJ complex message sets). If the cable modem server (CMS) determines that there is sufficient bandwidth available in the hybrid fiber coaxial (HFC) cable network, the process proceeds to Step 1410, where the cable modem server (CMS) [130, 133] instructs the ATM cable modem of the headend station to perform two functions: assign the desired priority levels with proper quality of service parameter (QOS) and implement the IEEE 802.14 HFC MAC (HMAC) layer protocol to accommodate the required bandwidth for the multimedia conference call. The cable modem server sends either CM-setup message (e.g., Steps 70 and 71 of FIG. 15) in case of the calling party or CM-connect message (e.g., Steps 72 and 73 of FIG. 15) in case of the called party, and then the ATM cable modem of the headend station sends the same message to the corresponding ATM cable modem of the cable modem-based customer premises (e.g., Steps 75 to 76, and 73 to 74 of FIG. 15). In any situation, the signaling functional entity (610 of FIG. 6) of the ATM cable modem of the headend station, will translate the required parameters of CM-setup and CM-connect messages of the CMsig control and signaling protocol scheme into appropriate control and signaling messages of the IEEE 802.14 HFC MAC protocol (IEEE 802.14 HFC MAC protocol is not yet finalized, and it is not clear what control and signaling messages will be adopted by the standard). If there is insufficient bandwidth in the HFC access network, the process proceeds to Step 1409, which sends a request for rejecting the call by the cable modem server (CMS) [130, 133], and the process then stops in Step 1418.

After communicating with the headend to reserve bandwidth by the CMS in Step 1410, in Step 1415, the CMS [130, 133] informs the central ATM network server (CAS) 135, as well as MPC's (101-1, 101-2) of the premises networks (170-1, 170-2), for confirmation of the bandwidth of the HFC access network (e.g., CM-ACF message of the CMsig control and protocol scheme is used to confirm the bandwidth of the HFC network as shown in Steps 4 through 6 of FIG. 15. Steps 70–71 and 75–76 of FIG. 15 can be executed in parallel with Steps 4 through 6 of FIG. 15. Similarly, Steps 72 through 74 can run in parallel with Steps 28 through 30), and the process then continues to Step 1416. The bandwidth confirmation message for both HFC access and the ATM network is sent to all conference participants, including non-cable modem premises network based end points, in Step 1416 (an example of the bandwidth confirmation for the non-cable modem premises network-based calling party has not been shown in FIG. 15 for simplicity). The process continues to Step 1417, where a modified ITU-T H.323 protocol-based conference call, that includes CMsig messages of the invention, is established by the central ATM network server (CAS) 135 if the call type is central ATM network server (CAS) [e.g., Steps 25 through 58 of FIG. 15] or by the by the access multimedia bridge server (AMMS) [131, 132] if the call type is cable modem server (CMS) [no example for this situation is shown in FIG. 15]. The process then proceeds to Step 1418 which stops the process.

In step 1406, the central ATM network server (CAS) 135 determines whether there is sufficient bandwidth available with the ATM network to accept the multimedia conferencing call (e.g., Step 3 of FIG. 15). If there is sufficient bandwidth, the process proceeds to Step 1416 (described above), otherwise, the process proceeds to Step 1411, where the central ATM network server (CAS) 135 sends the message to all conference participants that the call has been rejected due to insufficient bandwidth.

In Step 1407, the access multimedia bridge server (AMMS) [131, 132] determines whether there is a sufficient bandwidth available with the ATM network to accept the multimedia conferencing call (this example is not shown in FIG. 15 for simplicity). If there is a sufficient bandwidth available in the ATM network, the process proceeds to Step 1413, otherwise the process proceeds to Step 1412. The access multimedia bridge server (AMMS) [131, 132] sends the message to all conference participants that the call has been rejected due to insufficient bandwidth available in the ATM network in Step 1412, and then process goes to Step 1418 where the process stops. In Step 1413, an ITU-T H.323 protocol-based conference call (this example is not shown in FIG. 15, but is similar to that shown in Steps 35 through 56 of FIG. 15) is established by the access multimedia bridge server (AMMS) [131, 132] and the process stops in Step 1418. In Step 1408, the central ATM network server (CAS)

135 determines whether there is a sufficient bandwidth available with the ATM network to accept the multimedia conferencing call. If there is a sufficient bandwidth available in the ATM network, the process continues to Step 1414, where a ITU-T H.323 protocol based conference call (this example is not shown in FIG. 15, but it will be similar as shown is steps 35 through 56 of FIG. 15) is established by the central multimedia bridge server (CMMS) 134 and then the process stops in step 1418. If there is insufficient bandwidth in Step 1408, the call is rejected by the CAS in Step 1411.

Various CMsig control and signaling protocol messages noted in Table 2, such as CM-call-reject, CM-call-alerting, CM-call-proceeding, etc., have not shown as examples in FIG. 15 for simplicity.

The MPC's (101-1, 101-2) within the premises networks use switched local area network hubs (SLHs) and ATM cable modems for communication between a hybrid fiber coaxial cable (HFC) network and the ATM network 160. Multimedia bridge servers are also connected to the ATM network via switched local area network hubs (SLHs). As a result, the multimedia conference, as well as high-quality content created through collaborative efforts over the hybrid networking environment via real-time multimedia conferencing, will have guaranteed performance if the switched local area network hubs operate within specified performance guidelines. In addition, non-cable modem MPC's (101-3, 101-4) of the premises networks also use switched local area network hubs (SLHs) and ATM cable modems for communication between the premises network and the ATM wide area network 160, thereby enabling multimedia conferencing that includes both cable modem and non-cable modem based computers to have guaranteed performance, for both multimedia conferencing and for collaborative content created through conferencing, if the SLH's operate within specified performance guidelines.

What is claimed is:

1. A system for providing real-time multimedia conferencing services, to a dispersed plurality of locations connected to an ATM wide area network (WAN), the system comprising:

an ATM wide area network including an ATM backbone network domain;

at least one ATM access network domain; and one or more ATM cable modems, wherein a headend station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, and if a location includes an ATM cable modem, a hybrid fiber coaxial (HFC) access network connects the location to the ATM access network domain within the WAN, wherein the plurality of locations in a multimedia conference call are all connected to a single ATM access network domain, and the cable modem server of the ATM access network domain coordinates a multimedia conference call with the central ATM network server, including, maintaining address information of all cable modem-based locations within said ATM access network domain, maintaining bandwidth availability information for all HFC access networks within said ATM access network domain, coordinating bandwidth allocation, and coordinating conferencing information with the central ATM network server.

2. A system according to claim 1, wherein the access multimedia bridge server of the ATM access network domain coordinates a multimedia conference call with the cable modem server of the ATM access network domain and with the central multimedia bridge server, including, coordinating receiving multimedia signals from the locations within the ATM access network domain for bridging, and, transmitting the bridged signals to the locations.

3. A system for providing real-time multimedia conferencing services, to a dispersed plurality of locations connected to an ATM wide area network (WAN), the system comprising:

an ATM wide area network including an ATM backbone network domain;

at least one ATM access network domain; and one or more ATM cable modems, wherein a headend station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, wherein if a location includes an ATM cable modem, a hybrid fiber coaxial (HFC) access network connects the location to the ATM access network domain within the WAN, and the central ATM network server of the ATM backbone network domain coordinates a multimedia conference call with all ATM access network domains having locations involved in the conference call, including, coordinating conferencing information, maintaining address information of all locations, maintaining bandwidth availability information for all HFC access networks, and, coordinating bandwidth allocation.

4. A system according to claim 3, wherein the central multimedia bridge server of the ATM backbone network domain coordinates a multimedia conference call with the central ATM network server of the ATM backbone network domain, including, coordinating receiving multimedia signals from the cable modem-based locations and non-cable modem-based locations within the plurality of ATM access network domains, for bridging, and, transmitting the bridged signals to the locations.

5. A system for providing real-time multimedia conferencing services, to a dispersed plurality of locations connected to an ATM wide area network (WAN), the system comprising:

an ATM wide area network including an ATM backbone network domain;

at least one ATM access network domain; and one or more ATM cable modems, wherein a headend station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, wherein if a location includes an ATM cable modem, a hybrid fiber coaxial (HFC) access network connects the location to an ATM access network domain within the WAN, and wherein a function component architecture of an ATM cable modem at a location comprises three logical entities, the entities providing local area network medium access and ATM protocol conversion, hybrid fiber coaxial (HFC) medium access control (MAC) and ATM protocol, and modulation/demodulation for the HFC network, and further wherein the three logical entities can be separate physical entities or a single combined entity.

6. A system according to claim 5, wherein the local area network medium access and ATM protocol conversion entity of the ATM cable modem further comprises a local area network (LAN) controller, medium access control (MAC) protocol to ATM protocol conversion with the segmentation and reassembly (SAR) function, and ATM protocol to medium access control (MAC) protocol conversion along the segmentation and reassembly (SAR) function, and further wherein the LAN controller controls traffic flow of the IEEE standard-based Ethernet (EN), Token Ring (TN), or Fiber Distributed Data Interface (FDDI), further wherein the MAC protocol to ATM protocol conversion with SAR function entity converts LAN traffic, coming from MPC's to the HFC cable network, to ATM cells, after performing the segmentation and reassembly (SAR) function, and transfers the ATM cells to random access memory buffers of the HFC MAC and ATM protocol entity, further wherein the ATM protocol to MAC protocol conversion with SAR function entity converts the ATM cells of LAN traffic, coming from the HFC cable network to MPC's, via the random access memory buffers of the HFC MAC and ATM protocol entity after performing the segmentation and reassembly (SAR) function via the LAN controller.

7. A system according to claim 5, wherein the HFC medium access and ATM protocol entity further comprises a hybrid fiber coaxial medium access control and signaling (HMACsig) entity, random access memory (RAM) buffers, ATM cell processor, an HMAC frame multiplexer, an HMAC frame demultiplexer, and a slave bandwidth controller, wherein the HMACsig entity implements a control and signaling scheme of the IEEE 802.14 HFC MAC protocol standard that controls the RAM buffers, ATM cell processor, HMAC frame multiplexer, HMAC frame demultiplexer, and slave bandwidth controller, and wherein RAM buffers store ATM cells coming to and from the ATM cell processor and local area network MAC and ATM protocol conversion entity; and wherein the ATM cell processor receives ATM cells from the HMAC frame demultiplexer and the RAM buffers, and transmits the ATM cells to the HMAC frame multiplexer and the ATM buffers in accordance with control and signaling messages received from the slave bandwidth controller and the HMACsig entity.

wherein the HMAC frame multiplexer prepares the HMAC frame for transfer over the HFC network, wherein the HMAC frame demultiplexer demultiplexes the HMAC frame to recover the ATM cells and sends the ATM cells to the ATM cell processor, and further wherein the slave bandwidth controller controls the bandwidth required over the HFC network and the LAN network by controlling the rate of the ATM cell processor based on instructions received from a master bandwidth controller of an ATM modem of an HFC network headend system.

8. A system according to claim 5, wherein said modulation/demodulation system for the HFC network further comprises modulation entity, demodulation entity, a digital to analog conversion system, an analog to digital conversion system, and a radio frequency (RF) tuner, wherein the modulation entity provides modulation of digital signals to be transferred over the HFC network, wherein the demodulation entity demodulates digital signals received from the HFC network, wherein the digital to analog conversion system converts digital signals into analog signals for transferring over the HFC network, wherein the analog to digital conversion system converts the analog signal into digital bit streams to be transferred to an MPC, and further wherein the RF tuner tunes channels of the HFC network.

9. A system for providing real-time multimedia conferencing services, to a dispersed plurality of locations connected to an ATM wide area network (WAN), the system comprising:

an ATM wide area network including an ATM backbone network domain;

at least one ATM access network domain; and one or more ATM cable modems, wherein a headend station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, wherein if a location includes an ATM cable modem, a hybrid fiber coaxial (HFC) access network connects the location to the ATM access network domain within the WAN, and wherein a protocol architecture of an ATM cable modem at a location comprises a first protocol stack for processing signaling information and a second protocol stack for transferring information other that signaling information, wherein in said first protocol stack, HMACsig standard-based control and signaling messages are processed using segmentation and reassembly (SAR) function, ATM adaptation layer (AAL), and ATM protocol, and ATM cells are transferred using an HMAC frame, and further where said second protocol stack is divided into two protocol stacks, wherein LLC and MAC protocols transfer information, other than signaling information, from the HFC access network to an MPC at the location, and AAL, ATM and HMAC protocols transfer information other than signaling information from an MPC at the location to the HFC network.

10. A system for providing real-time multimedia conferencing services, to a dispersed plurality of locations connected to an ATM wide area network (WAN), the system comprising:

an ATM wide area network including an ATM backbone network domain;

at least one ATM access network domain; and one or more ATM cable modems, wherein a headend station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, wherein if a location includes an ATM cable modem, a hybrid fiber coaxial (HFC) access network connects the location to the ATM access network domain within the WAN, wherein a functional component architecture of an ATM cable modem at an HFC network headend station comprises two logical entities, the entities providing a modulation/demodulation system for the HFC network, and an HFC MAC, ATM, higher layer protocol, system, and further wherein the two logical entities can be separate physical entities or a single combined entity.

11. A system according to claim 10, wherein the modulation/demodulation for the HFC network entity further comprises a modulation entity, demodulation entity, digital to analog conversion system, analog to digital conversion system, and radio frequency (RF) tuner, and further wherein the modulation entity modulates digital signals to be transferred over the HFC network, and further wherein the demodulation entity demodulates digital signals received from the HFC network, and further wherein the digital to analog conversion system converts the digital signal into analog form to be transferred over the HFC network, and further wherein the analog to digital conversion system converts the analog signal into digital bit streams to be transferred to an MPC at the location, and further wherein the RF tuner tunes channels of the HFC network.

12. The system according to claim 10, wherein the HFC, MAC, ATM, higher layer protocol, system further comprises a hybrid fiber coaxial medium access control and signaling (HMACsig) entity, a cable modem signaling (CMsig) entity, a signaling entity, a protocol conversion entity, ATM buffers, ATM cell processor, an HMAC frame multiplexer, an HMAC frame demultiplexer, and a master bandwidth controller, wherein the HMACsig entity implements a control and signaling scheme of the IEEE 802.14 HFC MAC protocol standard that controls ATM cell processor, HMAC frame multiplexer, HMAC frame demultiplexer, the master bandwidth controller, and the protocol conversion entity, wherein the cable modem signaling (CMsig) entity implements CMsig control and signaling protocol functions, wherein the signaling entity provides inter-signaling conversion functions between the HMACsig and the CMsig entities, wherein the ATM buffers store ATM cells, coming to and from the ATM cell processor, the ATM node/switch of the ATM backbone network domain, and the protocol conversion entity, in accordance with the CMsig entity, wherein the ATM cell processor receives ATM cells from the HMAC frame demultiplexer and the ATM buffers, and transmits the ATM cells to the HMAC frame multiplexer and the ATM buffers in accordance with control and signaling messages received from the master bandwidth controller, the CMsig entity, and the HMACsig entity, wherein the HMAC frame multiplexer prepares the HMAC frame for transfer over the HFC network in accordance with the IEEE 802.14 HFC MAC protocol standards, wherein the HMAC frame demultiplexer demultiplexes the HMAC frame to recover the ATM cells and sends the ATM cells to the ATM cell processor, wherein the master bandwidth controller controls the bandwidth required over the HFC network and the LAN network by controlling the rate of the ATM cell processor and provides instructions to slave bandwidth controllers of ATM modems at the locations, and wherein the protocol conversion entity provides protocol conversion between UDP, IP and ATM, including segmentation and reassembly function.

13. A system for providing real-time multimedia conferencing services, to a dispersed plurality of locations connected to an ATM wide area network (WAN), the system comprising:

an ATM wide area network including an ATM backbone network domain;

at least one ATM access network domain;

one or more ATM cable modems, and wherein a headend station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, wherein if a location includes an ATM cable modem, a hybrid fiber coaxial (HFC) access network connects the location to the ATM access network domain within the WAN, wherein a protocol architecture of an ATM cable modem at HFC network headend station comprises a first protocol stack for processing signaling messages and a second protocol stack for transferring information other than signaling information, wherein said first protocol stack is further divided into a first divided protocol stack and a second divided protocol stack, wherein HMACsig standard-based control and signaling messages are processed using segmentation and reassembly (SAR) function, ATM adaptation layer (AAL), and ATM protocol, and ATM cells are transferred over the HFC network using an HMAC frame, all in the first divided first protocol stack, and, wherein CMsig and H225.0 control and signaling and protocol messages are processed using UDP/TCP, IP, AAL and ATM protocol, and are transferred over the ATM network, all in the second divided first protocol stack, wherein a higher layer signaling entity in the first protocol stack provides intersignaling communication between HMACsig and CMsig, further wherein said second protocol stack is further divided into a first divided second protocol stack and a second divided second protocol stack, wherein ATM adaptation layer (AAL), ATM and HMAC protocols transfer information, other than signaling information, between a cable modem at a location and a headend station, over the HFC network, all in the first divided second protocol stack, and wherein IP, AAL and ATM protocols transfer information, other than signaling information between a cable modem at the headend station and an ATM switch/node at the ATM network, all in the second divided second protocol stack.

14. A system for providing real-time multimedia conferencing services, to a dispersed plurality of locations connected to an ATM wide area network (WAN), the system comprising:

an ATM wide are network including an ATM backbone network domain;

at least one ATM access network domain; and one or more ATM cable modems, wherein a headed station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, wherein if a location includes an ATM cable modem, a hybrid fiber coaxial (HFC) access network connects the location to the ATM access network domain within the WAN, wherein a control and signaling protocol method, for initialization of a multimedia conference call and transferring of traffic over the HFC access network and the ATM WAN, comprises:

setting up a multimedia conference call by an ATM cable modem-based location, over the hybrid fiber coaxial (HFC) access network, with a headend station-based ATM cable modem connected to the ATM access node/switch of the ATM access network domain, for a multimedia conference call wherein all locations are ATM cable modem-based and within the ATM access network domain, and setting up a multimedia conference call by an ATM cable modem-based location, over the hybrid fiber coaxial (HFC) access network, with a headend station-based ATM cable modem connected to the ATM backbone network domain, for a multimedia conference call wherein not all locations are ATM cable modem-based or within a same ATM access network domain.

15. A system according to claim 14, wherein the control and signaling protocol method further comprises:

acting as central control point by the headend station-based ATM cable modem for communication between the ATM cable modem-based location, and the cable modem server of the ATM access network domain, translating control and signaling messages between the control and signaling protocol and an HMACsig control and signaling scheme, which implements the IEEE 802.14 HFC MAC protocol, and using a master bandwidth controller of the headend station-based ATM cable modem to control a slave bandwidth controller of the ATM cable modem-based location, in accordance with the control and signaling protocol and the HMACsig control and signaling scheme.

16. A system according to claim 15, wherein the control and signaling protocol method further comprises using control and signaling protocol message sets transparently by the ATM cable modems-based locations, headend station-based ATM cable modems, cable modem servers of the ATM access network domains, multimedia bridge servers of the ATM access network domains, the central ATM network server of the ATM backbone network domain, and the central multimedia bridge server of the ATM backbone network domain.

17. A method for providing real-time multimedia conferencing services to a dispersed plurality of locations connected to an ATM wide area network (WAN) of a system, the system comprising:

an ATM wide area network including an ATM backbone network domain;

at least one ATM access network domain; and one or more ATM cable modems, wherein a headend station-based ATM cable modem is provided at each ATM access network domain in said WAN, said ATM cable modems are designed to carry two-way multimedia signals, a number of ATM access network domains in the WAN is based on a size of the WAN, each ATM access network domain includes at least one access multimedia bridge server and at least one cable modem server, an ATM backbone network domain includes at least one central multimedia bridge server and at least one central ATM network server, the method comprising the steps of:

determining if control and signaling protocol messages should be received by the cable modem server of the ATM access network domain or by the central ATM network server of the ATM backbone network;

determining whether the multimedia conference call will be accepted based on a determination of the computed bandwidth requirement in the hybrid fiber coaxial (HEC) network and the ATM wide area network, and determining whether multimedia bridging will be performed by the access multimedia bridge server of the backbone network domain.

18. A method according to claim 17, wherein the cable modem server of an access network domain sets up the multimedia conference call if all locations of conference participants in the call are cable modem-based locations all within the access network domain, and wherein the central network server of the backbone network domain, together with cable modem servers of all access network domains having locations with participants in the multimedia conference call, set up the multimedia conference call if all locations in the call are not within a same access network domain, or, if there is a combination of cable modem-based locations and non-cable modem-based locations, or, if there is only non-cable modem-based locations.

19. A method according to claim 17, wherein the access multimedia bridge server bridges multimedia signals if all locations of conference participants are cable modem-based and if all locations are connected to a same access network domain, and wherein the central multimedia bridge server of the backbone network domain bridges multimedia signals if, locations of cable modem-based conference participants are in more than one access network domain, if there is a combination of cable modem-based conference participants and non-cable modem-based conference participants, or, if there are only non-cable modem-based conference participants.

* * * * *